United States Patent [19]

Kintner

[11] 4,200,914
[45] Apr. 29, 1980

[54] MEMORY PROGRAMMING CONTROL SYSTEM FOR STORING A WIRE NUMBER PROGRAM OF A LADDER DIAGRAM FOR A PROGRAMMABLE CONTROLLER

[75] Inventor: Paul M. Kintner, Bayside, Wis.

[73] Assignee: Eaton Corporation, Cleveland, Ohio

[21] Appl. No.: 853,879

[22] Filed: Nov. 22, 1977

[51] Int. Cl.$^2$ .......................... G06F 15/46; G06F 9/16
[52] U.S. Cl. .................................................. 364/900
[58] Field of Search .......................... 364/900, 104, 200

[56] References Cited

U.S. PATENT DOCUMENTS

| 3,686,639 | 8/1972 | Fletcher | 364/900 |
| 3,930,233 | 12/1975 | Morley | 364/900 |
| 3,938,104 | 2/1976 | Henry | 364/900 |
| 3,944,984 | 3/1976 | Morley | 364/900 |
| 3,944,987 | 3/1976 | Koyanagi | 364/900 |

OTHER PUBLICATIONS

The Bulletin "PMC 1750 Programmable Matrix Controller", Allen-Bradley Corp., Jul. 1973.

*Primary Examiner*—Gareth D. Shaw
*Assistant Examiner*—David Y. Eng
*Attorney, Agent, or Firm*—Hugh R. Rather; William A. Autio

[57] ABSTRACT

A portable programmer panel incorporating switches, logic circuits and data indicators for storing a wire number program of a ladder diagram in a memory. A memory board is plugged into the panel. Selected sets of switches corresponding to fields F1, F2 and F3 are repeatedly set on a decimal basis for three successive instruction words (data) to be multiplexed into memory locations, respectively indicative of the input wire number (F1), the contact number (F2), and the output wire number (F3) for a series contact or the last parallel contact; or the input wire number (F1) and the control coil or other output device number (F3) for an output function; or the input wire number (F1) and the contact number (F2) for a parallel contact other than the last. Simultaneously, a switch in the F2 field is set to program the normally-open (N.O.) or normally-closed (N.C.) nature of the contact. Write-control switches are selectively actuated to enter the data in the memory and distinguish between all but the last one of parallel contacts, series contacts or the last parallel contact, and a control coil or other output function, and to display such data in decimal form and to step to the next memory address. Switches are incorporated along with a decimal indicator for displaying the memory location being addressed and for "rolling" at high speed or for stepping to locations forward or back and for displaying the data stored in each memory location being traversed.

18 Claims, 15 Drawing Figures

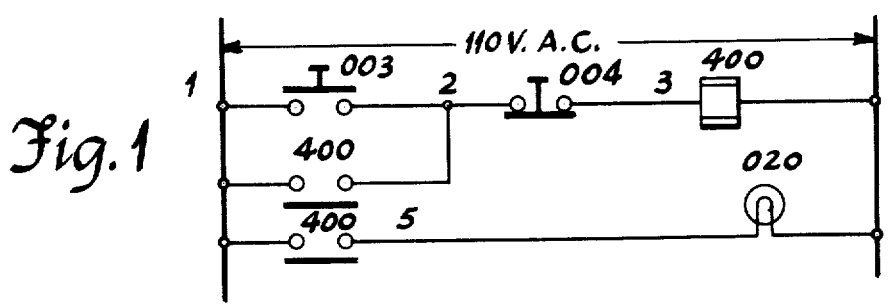
Fig. 1
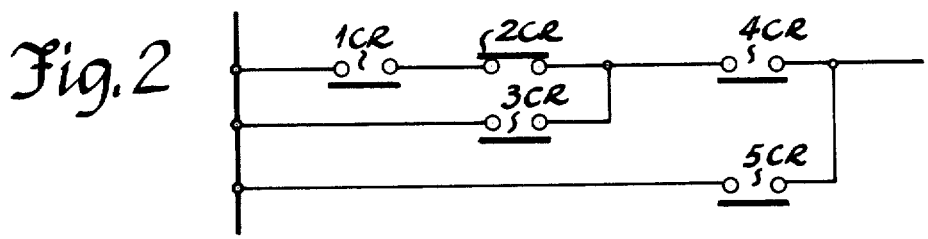
Fig. 2
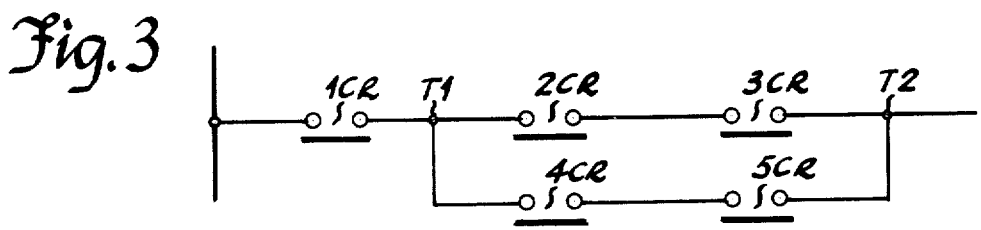
Fig. 3
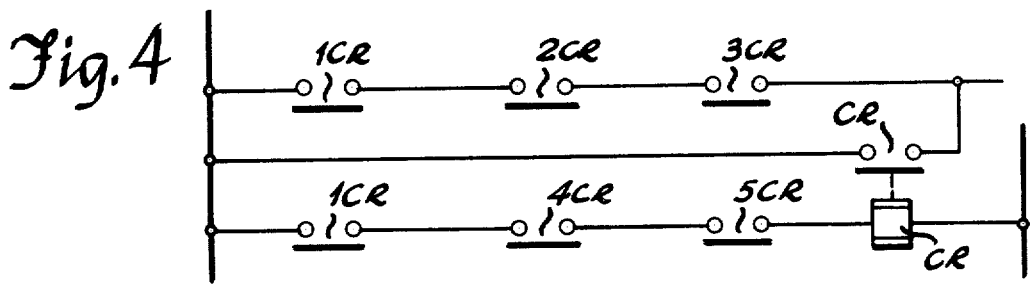
Fig. 4
Fig. 9
| MEMORY LOCATION | INPUT WIRE NO. | CONTACT NO. | NO NC | OUTPUT WIRE NO. |
|---|---|---|---|---|
| 000 | 001 | 003 | 0 | SC |
| 001 | 001 | 400 | 0 | 002 |
| 002 | 002 | 004 | 0 | 003 |
| 003 | 003 | SC | | 400 |
| 004 | 001 | 400 | 0 | 005 |
| 005 | 005 | SC | | 020 |
| 255 | | SC = SPECIAL CODE | | |
Fig. 8
| WHEEL INDICATION | ELECTRICAL OUTPUT ||||
|---|---|---|---|---|
| | COMMON | 8 | 4 | 2 | 1 |
| 0 | O | | | | |
| 1 | O | | | | O |
| 2 | O | | | O | |
| 3 | O | | | O | O |
| 4 | O | | O | | |
| 5 | O | | O | | O |
| 6 | O | | O | O | |
| 7 | O | | O | O | O |
| 8 | O | O | | | |
| 9 | O | O | | | O |

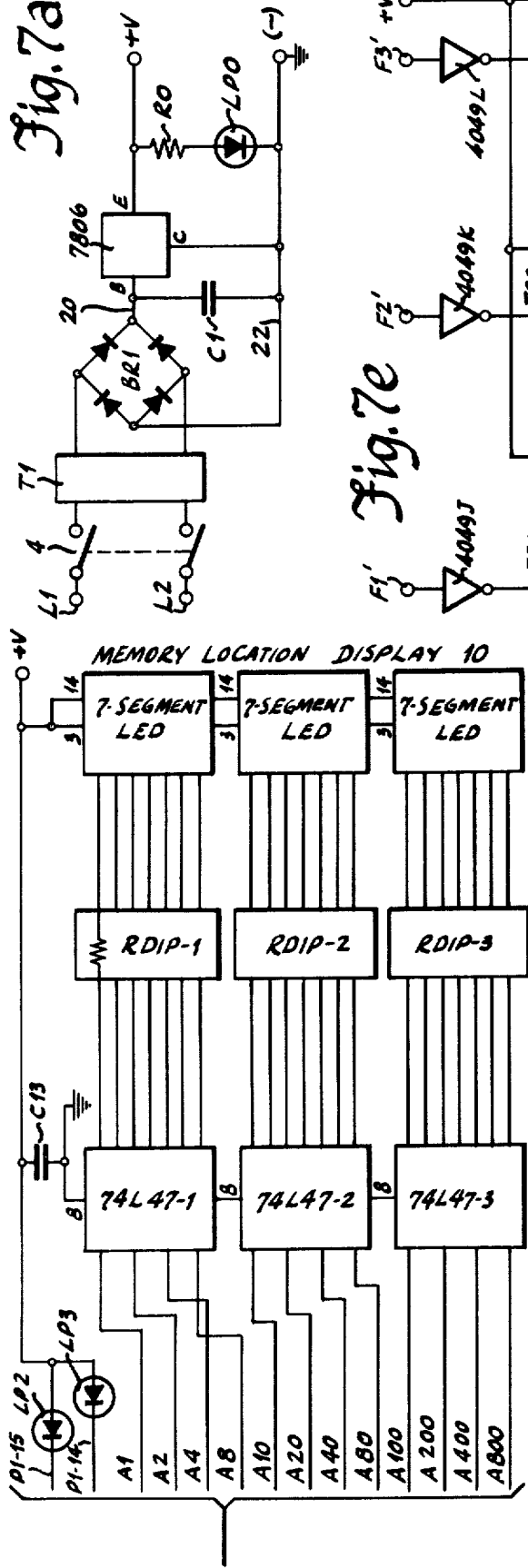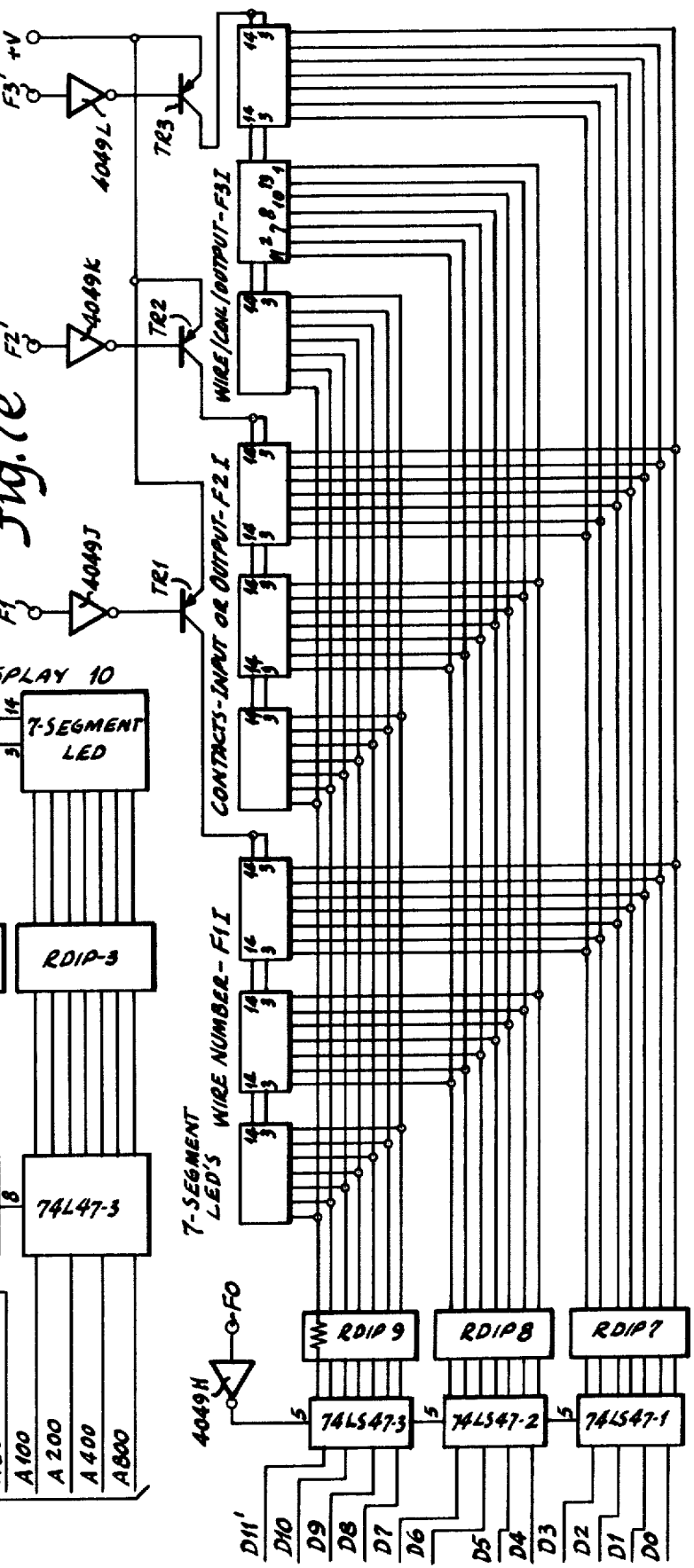

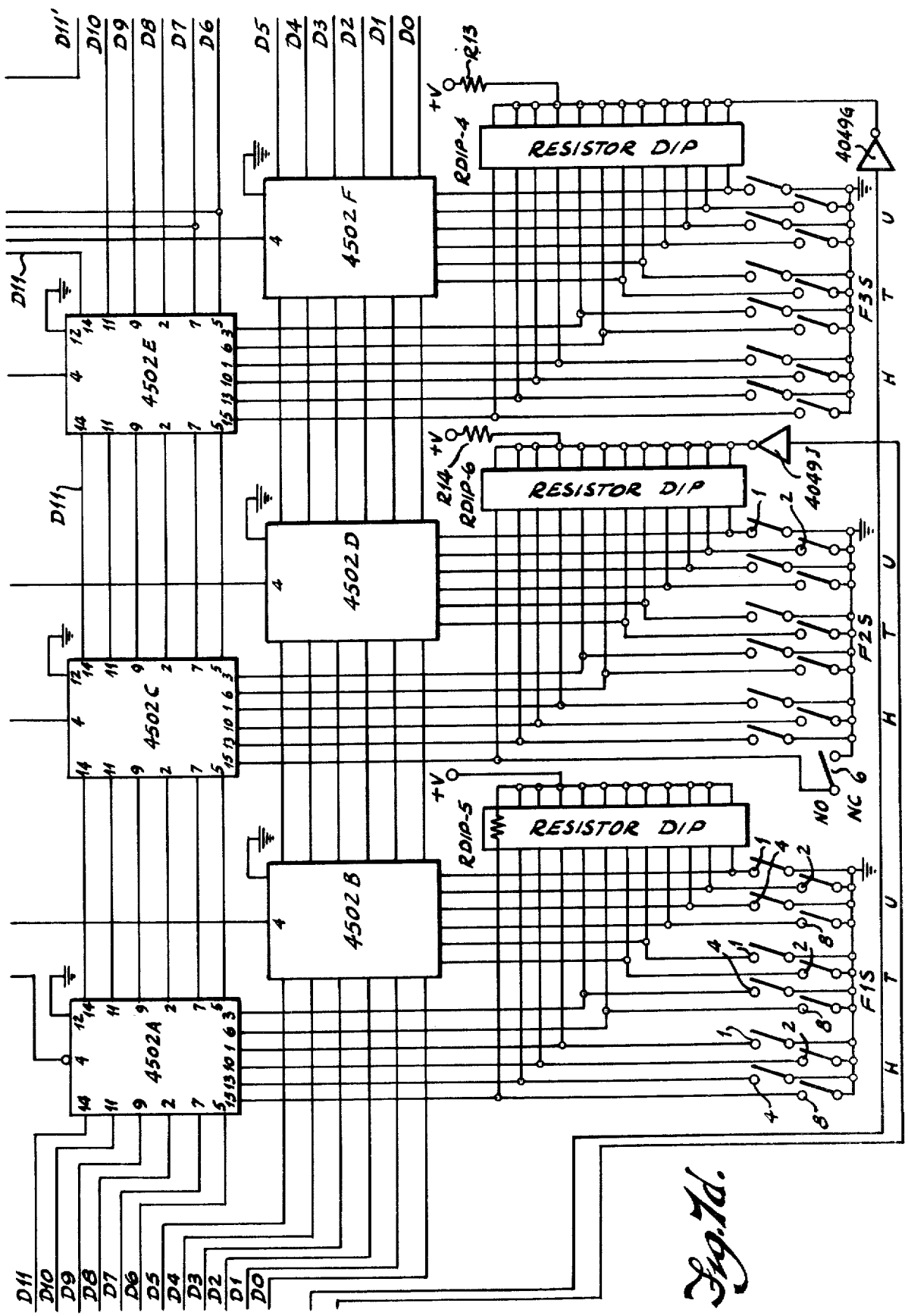

MEMORY PROGRAMMING CONTROL SYSTEM FOR STORING A WIRE NUMBER PROGRAM OF A LADDER DIAGRAM FOR A PROGRAMMABLE CONTROLLER

CROSS-REFERENCE TO RELATED APPLICATION

Reference is made to my copending application Ser. No. 841,431, filed Oct. 12, 1977, for a disclosure of a programmable controller with which this programmer may be used.

BACKGROUND OF THE INVENTION

In order to program a memory, it is desirable to understand how it must control a programmable controller. The task of a programmable controller is to compute the logic status represented by interconnected contacts and to apply the end result of such logic computation to a coil to either energize or deenergize it or to send such result to the outside to control external devices such as solenoids, for example.

This logic and the interconnected contacts represented thereby is illustrated by a diagram. The convention used in such diagram is based on the standard practice used to represent electro-mechanical relay logic and is retained in programmable controller applications because of the widespread familiarity with this type of diagram, commonly termed a ladder diagram because each set of logic that corresponds to one output resembles the rung of a ladder. That is, in a ladder diagram, the left and right verticals are the power lines and the horizontal "rungs" are the sets of logic representing the control elements such as interconnected contacts as shown in FIG. 1.

In an electromechanical relay ladder diagram, the direction of logic is from the left hand vertical 110 volt A.C. power line flowing through the contacts and coils to the right hand vertical power line. The programmable controller emulates this action, but there are quite significant differences between the internal functions of the programmable controller and the relay system that it replaces. Among these are:

1. In the relay system, the logic actions occur in parallel or simultaneously through the rungs of the ladder. In the programmable controller, these logic actions are computed sequentially, one contact at a time.

2. In the programmable controller, the external contacts are not an actual part of the logic, as are the pushbuttons and limit switches of the relay system, but rather power signals therefrom are brought into the programmable controller and then "relayed" through isolators to become inputs signals. The programmable controller then treats these external contacts in the same manner as internal contacts except as controlled by an input signal rather than by a coil.

3. There are no L1 or L2 power lines for the logic section of the control even though two vertical lines may be drawn on a programmable controller diagram. In the latter, there is a logic flow from the left line to the right line rather than a power flow as in the relay system ladder diagram.

4. In the programmable controller, the results of logic actions are "relayed" out through such devices as photo-isolators and Triacs in order to control external devices.

In view of the above, the functions of programmable controllers can be actually grouped into three sections:

(1) the input section consisting of the power source from line L1-L2 and connections through limit switches and pushbuttons to the input terminals of the controller; (2) the logic section based on internal processing resembling to a great degree computer-like functions; and (3) the output section where logic function results control external devices connected to the output terminals of the controller and power lines L1-L2.

As stated previously, the logic task consists of determining the state of a signal coming from a set of interconnected contacts, based both on how the contacts are interconnected and the states of the individual contacts, open or closed. There are only two basic contact connections to be considered: the series connection and the parallel connection. For a series connection of three normally-open contacts 1, 2 and 3, the logic action is: a logic signal will flow from left to right and be present at the "output" if, and only if, all three contacts are closed. This is the equivalent of an AND-logic operation, that is a logic "1" is obtained if Contact-1 and Contact-2 and Contact-3 are closed.

But more precisely, one does not think in terms of contacts being open or closed but rather whether the devices controlling the contacts are energized or deenergized. This leads to the concept of normally-open (N.O.) and normally-closed (N.C.) contacts. For three series contacts controlled by coils 1CR, 2CR and 3CR, where reference is made to the control coils controlling the contacts and where that contact controlled by coil 3CR is normally-closed, the logic action is now described as follows: a logic "1" signal is obtained if, and only if, coils 1CR and 2CR are energized and coil 3CR is deenergized. The logic equivalent of labeling a contact as normally closed is the NOT-logic operation.

For three parallel contacts of coils 1CR, 2CR and 3CR where the first two contacts are N.O. and the third contact is N.C., the logic action is: a logic output of "1" is obtained if, and only if, either coil 1CR or 2CR is energized or if coil 3CR is deenergized. This is commonly regarded as equivalent to the OR-logic operation.

Programmable controllers compute the logic represented by series and parallel contacts through sequential instructions placed into a memory. Each instruction has a portion indicating the type of operation to be performed, series or parallel, and a reference number defining where the internal processor is to go to find the status of the device (input or coil) controlling the contact. The programmer must determine and write these instructions according to the manner in which the contacts are interconnected.

Programming is quite simple for contacts in series. One could write three instructions for the aforementioned series N.O., N.O., and N.C. contacts thus:

SERIES N.O. 1CR
SERIES N.O. 2CR
SERIES N.C. 3CR where "SERIES" indicates the type of internal action to be performed, actually an AND-logic operation, and 1CR, 2CR, and 3CR are the "reference numbers" for the internal control coils energizing the "contacts". As seen above, the instructions are also "tagged" N.O. or N.C., meaning normally-open and normally-closed.

Programming is also simple for the aforementioned parallel connection of N.O., N.O., and N.C. contacts where one would write:

OR N.O. 1CR

OR N.O. 2CR
OR N.C. 3CR

Programming simplicity, however, can be retained when series and parallel operations are intermixed only if all paralleled contacts are connected to the left line as illustrated in FIG. 2. The instructions for this example would be:

SERIES N.O. 1CR
SERIES N.C. 2CR
OR N.O. 3CR
SERIES N.O. 4CR
OR N.O. 5CR

The early prior art controllers required parallel contacts to be connected in this fashion; most of the small ones still do. This means that a diagram such as FIG. 3 must be modified as shown in FIG. 4 by introducing a coil to get the single contact going to the left line since you can "OR" only a single contact with the previous result. The added elements increase the cost.

It is desirable to have a programming means which accommodates such configurations as FIG. 3 without requiring the user to modify his diagram. This could be done if means within the processor were provided to store and retrieve the partial results of the logic operation. The program for FIG. 3 might then be written:

| SERIES N.O. | 1CR | RETRIEVE   | T1  |
| STORE       | T1  | SERIES N.O.| 4CR |
| SERIES N.O. | 2CR | SERIES N.O.| 5CR |
| SERIES N.O. | 3CR | OR         | T2  |
| STORE       | T2  |            |     |

The action is as follows: at the first branch, it is recognized that one will have to come back later and compute the alternative parallel branch. Accordingly, the logic value at that point is stored in location T1 of a memory present for this purpose. When the first branch has been transversed, the logic value at this point is also stored in location T2 of that memory. The programmer then backs up and retrieves the value in location T1 to start the second branch. The result at the end of the second branch is OR'd with the value in location T2.

The procedure outlined is available in certain prior art large controllers and in at least one small controller. The large controllers provide cathode-ray tube diagram monitors which simplify the task of storing and retrieving temporary logic results. However, programming can become difficult without such aids when diagrams become complex, for the programmer must then keep track of a number of temporary results, storing and retrieving them as required. It is especially difficult for maintenance men to grasp the logic being performed by a list of instructions as given above. Accordingly, it is desirable to provide improved means that are simple and easy to program and does not require any diagram modification.

SUMMARY OF THE INVENTION

An object of the invention is to provide an improved programmer for a memory.

A more specific object of the invention is to provide an improved programming panel having a slot into which a memory board may be plugged and means for storing a wire number program in the memory.

Another specific object of the invention is to provide an improved programming panel having a slot into which a memory board may be plugged and means for storing a ladder diagram program of multiplexed sets of instruction words in successively numbered address locations therein.

Another specific object of the invention is to provide the aforementioned improved programming panel with means for displaying the multiplexed sets of instruction words in decimal form.

Another specific object of the invention is to provide the aforementioned improved programming panel with means for displaying the address locations in decimal form.

Another specific object of the invention is to provide the aforementioned improved programming panel with means for storing the multiplexed sets of instruction words in binary-coded-decimal form and displaying them in decimal form.

Another specific object of the invention is to provide the aforementioned improved programming panel with means for addressing the memory locations in binary form and displaying them in decimal form.

Another specific object of the invention is to provide improved means for stepping a binary counter and a binary-coded-decimal counter in unison and for preventing the binary counter from stepping out of its count synchronism with the BCD counter at its reverse recycle point.

Another specific object of the invention is to provide improved means for stepping an up-down binary counter and an up-down binary-coded-decimal counter in unison and for causing the binary counter to track the BCD counter forward and up to its reverse recycle point thereby to allow use of the binary counter for memory addressing and use of the BCD counter for decimal display of the memory locations.

Another specific object of the invention is to provide an improved memory programming logic system for programming a memory having bidirectional data terminals and means for displaying the instruction words stored in binary-coded-decimal form in the memory, means for using one binary bit of a contact instruction word as indicative of normally-open or normally-closed contact, and logic means for preventing inclusion of the N.O.-N.C. binary bit in the instruction word numerical value display.

Another specific object of the invention is to provide an improved programming panel having means for automatically storing in the memory a special blanking code of all 1's in a first predetermined location indicative of an OR-logic instruction whenever any contact but the last one of a plurality of parallel contacts is stored in the memory.

Another specific object of the invention is to provide an improved programming panel having means for automatically storing in the memory a special blanking code of all 1's in a second predetermined location indicative of an output instruction whenever such output instruction or a coil instruction is stored in the memory.

Others objects and advantages of the invention will hereinafter appear.

BRIEF DESCRIPTION OF THE DRAWINGS

FIG. 1 shows a standard relay ladder diagram of an electrical system for turning a lamp on and off;

FIG. 2 is a diagram showing series and parallel connection of N.O. contacts and a N.C. contact representing AND and OR-logic functions wherein all paralleled contacts connect to the left power line of the ladder diagram;

FIG. 3 is a diagram showing series and parallel connection of N.O. contacts wherein the paralleled contacts do not connect to the left power line of the ladder diagram;

FIG. 4 is a diagram showing how the diagram of FIG. 3 must be modified to obtain a condition wherein all paralleled contacts are connected to the left power line;

FIGS. 7a-7e is a programming logic diagram showing the details of the logic circuits mounted in the panel of FIG. 5 for writing the instruction words into the memory and reading them therefrom for display;

FIG. 8 is a table showing the function of the decimal to BCD (binary-coded-decimal) bi-directional pushbutton selector switches of FIGS. 5 and 7c;

FIG. 9 is a table showing in decimal form how the ladder diagram of FIG. 1 may be programmed into the memory of FIGS. 5 and 6;

WIRE NUMBER PROGRAMMING

Figure 5:
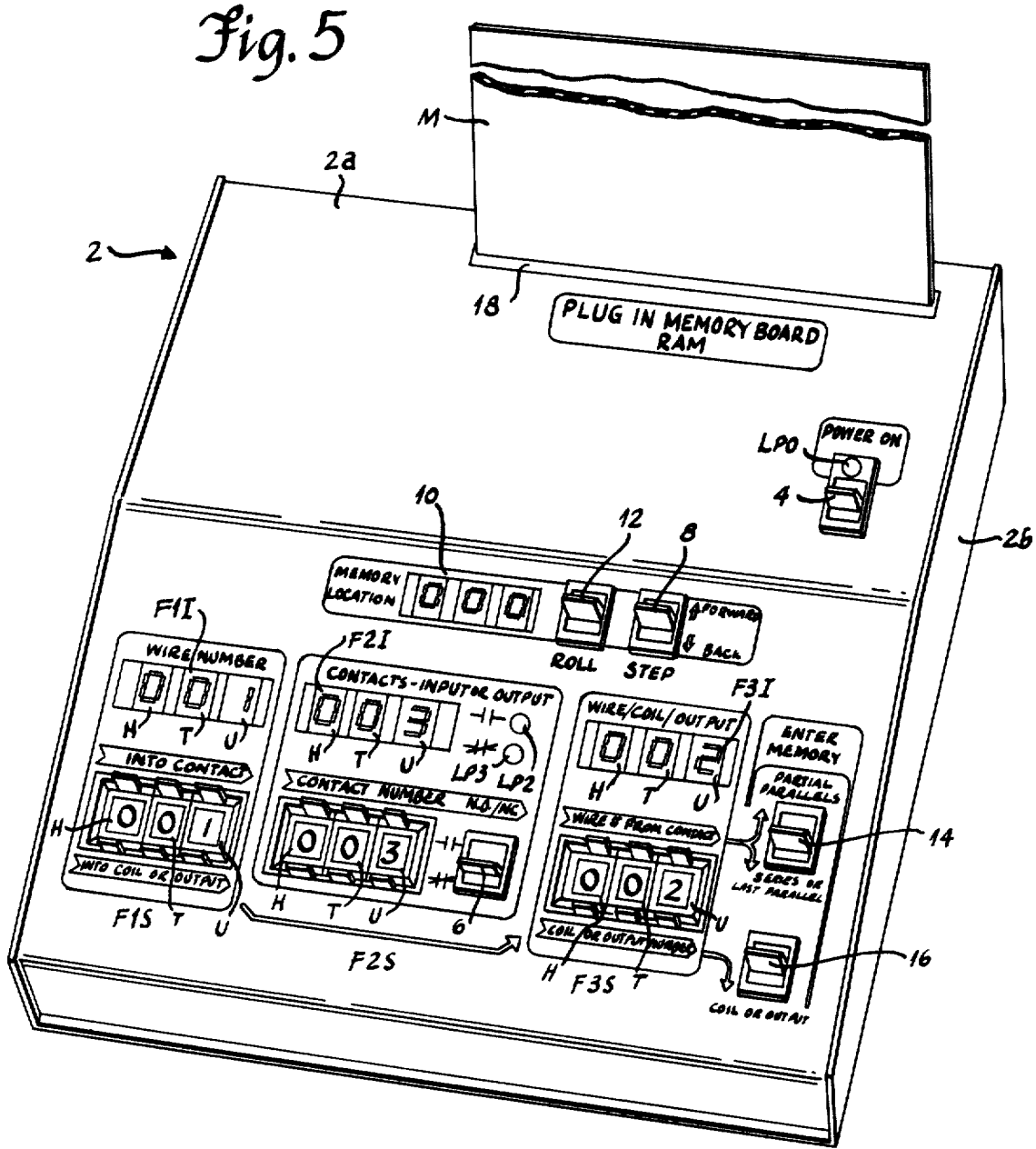
FIG. 5 is a reduced isometric view of a programming panel including the manual switches, indicators and the memory PC (printed circuit) board plugged into the connector socket thereof.
Figure 11:
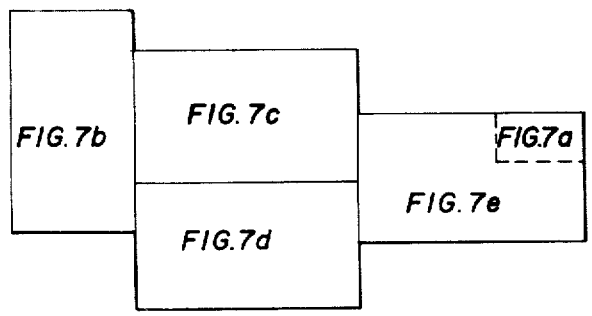
FIG. 11 shows the interconnection or arrangement, of the individual drawings of FIGS. 7a-7e.

The programming basis of this programming panel, as well as the programmable controller disclosed in my aforementioned copending application with which it may be used, is known as "wire number programming". As a basis therefore, the ladder diagram is provided with wire numbers as in a relay ladder diagram. Each wire number defines an interconnected portion of the circuit known as a circuit node. The instructions written by the programmer define the logic connected to each wire number as will hereinafter appear.

The processor in the programmable controller then determines the status of each wire number and maintains a complete record in a wire number memory incorporated for that purpose. As will be seen, this provides a particularly simple programming method for, in effect, the result of every logic operation is stored and the programmer does not have to pick and choose as well as to provide additional apparatus to keep track of what has been stored. The maintaining of wire number status also affords a powerful maintenance tool in that signal tracing is merely a matter of calling up wire number values from the memory of the controller.

Wire number programming requires only two instructions, namely, (1) the contact instruction and (2) the output instruction.

CONTACT INSTRUCTION

The contact instruction is written for each contact and consists of three parts: (a) the input wire number to the contact, (b) the contact reference number, and (c) the output wire number from the contact. The contact reference number additionally has a "bit" flagging the contact as normally-open or normally-closed. These three parts of the instruction are termed F1, F2 and F3, respectively, and these characters are used alone or as prefixes or suffixes throughout the logic diagram of FIGS. 7b-7e and timing chart of FIG. 10 to relate these parts of the instruction to the "fields" or time periods during which the respective parts of the instruction are controlled and programmed as well as the data indicators on the programming panel hereinafter described.

The instructions for three series contacts are written as follows:

| F1 | F2 | F3 | ENTER |
|---|---|---|---|
| 1 | 401-0 | 2 | SERIES |
| 2 | 402-0 | 3 | SERIES |
| 3 | 403-1 | 4 | SERIES | where F1, F2 and F3 are the multiplexed time periods or fields, 1-4 are wire numbers and 401-403 are contact reference numbers, contacts 401-0 and 402-0 being normally-open and contact 403-1 being normally closed. The "enter" switch is actuated to its "series" position to store each instruction in the memory and automatically to advance the memory location. The controller AND's the results of these instructions.

The instructions for three parallel contacts or contacts that connect to the same output wire number are written as follows:

| F1 | F2 | F3 | ENTER |
|---|---|---|---|
| 1 | 401-1 |  | PARTIAL PARALLEL |
| 1 | 402-0 |  | PARTIAL PARALLEL |
| 1 | 403-0 | 5 | LAST PARALLEL | where F1, F2 and F3 are the multiplexed time periods or fields, the 1's are input wire numbers to parallel contacts, 401-1 is a N.C. contact, 402-0 and 403-0 are N.O. contacts, and 5 is the output wire number to which all three contacts connect. As shown above, the F3 sections of the first two instructions are left blank, although the output wire number 5 can be inserted if desired, for the programming panel will put a special code of all 1's in this section when the instruction is entered as "partial parallel" as hereinafter more fully described. Upon reading these instructions, the programmable controller will detect the special code and the results of these instructions will be OR'd until the final instruction when the result of the OR operations, including the final instruction, is stored in the wire number memory.

OUTPUT INSTRUCTION

The output instruction involves writing of only two sections F1 and F3. The input wire number connected to an output such as a control coil, latching coil, timing coil, or power output is entered in field F1. The output element reference number is then entered into field F3. When the instruction is then entered into the memory as "coil or output" by operating a manual "enter" switch as hereinafter described, the programming panel automatically introduces the special code of all 1's into field F2, and this is used by the programmable controller to initiate an output action.

DESCRIPTION OF THE PROGRAMMING PANEL—FIG. 5

The programming panel is used to generate a wire number program for the programmable controller disclosed in my aforementioned copending application Ser. No. 841,431. For exemplary purposes, this program will consist of sets of instruction words for logic functions that will simulate the ladder diagram shown in FIG. 1. These sets of instruction words or data will be written into the memory to be stored therein for subsequent use in running the programmable controller shown in the above copending application.

Figure 7B:
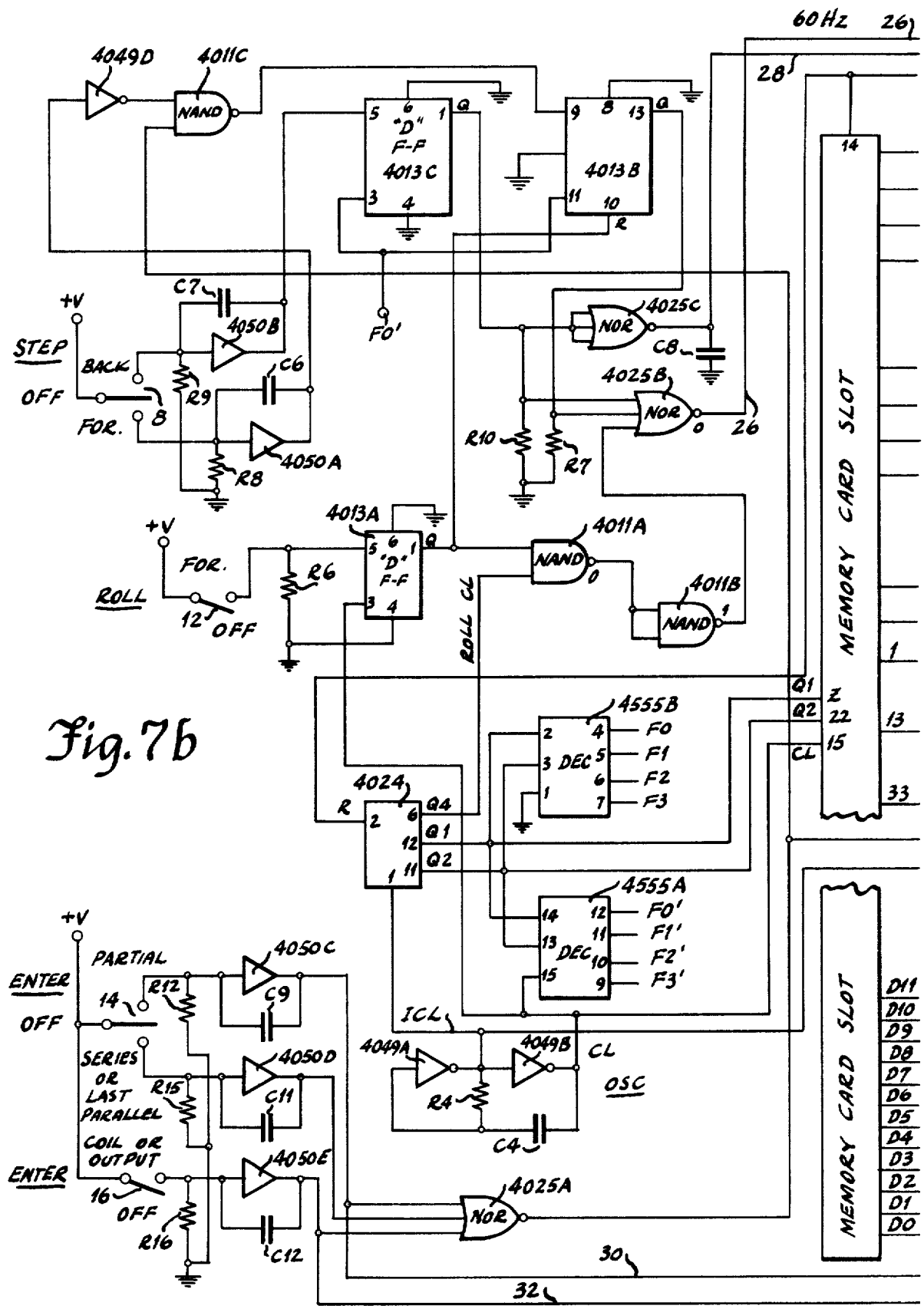

As shown in FIG. 5, the programming panel comprises an enclosure 2 of metal or the like having a top panel 2a attached to a frame 2b for housing and supporting the programming control logic circuits of FIGS. 7a–7e including the manual switches and indicators. The power supply circuit of FIG. 7a and the logic circuits of FIGS. 7b–7e are arranged on PC boards and are mounted to the lower surface of top panel 2a. The power cord enters this panel 2 through a hole in the rear wall thereof and is connected through a fuse to "power on" switch 4. As shown in FIGS. 5 and 7a, power on switch 4 is a double-pole single-throw type toggle switch for connecting A.C. power lines L1 and L2 to transformer T1 thereby to supply the operating power to the programming panel as hereinafter more fully described. A power-on indicator lamp LPO is mounted adjacent to power switch 4.

The programming panel of FIG. 5 also comprises three sets of bi-directional pushbutton selector switches F1S, F2S and F3S arranged from left to right with three switches in each set including a units switch U, a tens switch T and a hundreds switch H relatively located in the normal manner from the right to the left. As will be apparent, these selector switches are arranged for setting up three three-digit decimal numbers in the process of programming the (1) input wire number to a contact, (2) the contact number and (3) the output wire number from the contact that are multiplexed into the memory during time periods or fields F1, F2 and F3, respectively, as hereinafter more fully described.

These selector switches are each provided with a pair of pushbuttons as shown in FIG. 5 and a rotary decimal indicator visible through the window between the pushbuttons. The lower pushbutton advances the selector switch up from 0 to 9 one step each time the button is pressed, and the upper pushbutton reverses the selection similarly one step at a time from 9 to 0. These selector switches are of the decimal-to-BCD decoder type made by Durant Digital Instruments that are actuated on a decimal basis to provide a BCD (binary-coded-decimal) electrical output as shown in FIGS. 7d and 8. Each of these selector switches connects a common ground to BCD outputs 1, 2, 4 and 8 in the combinations shown in FIG. 8 when the wheel indicator is set to a decimal value, except the hundreds digit H of switch F2S wherein only BCD outputs 100, 200 and 400 are used for numerical contact data and BCD output 800 is used as a bit to program and distinguish between a normally-open and a normally-closed contact. For this purpose, the programming panel is provided with a single-pole single-throw switch 6 shown in FIGS. 5 and 7d which programs a normally-open contact when it is open and which is closed to program a normally-closed contact.

The programming panel is also provided with a "step" switch 8 of the single-pole double-throw momentary type shown in FIGS. 5 and 7b for stepping a program counter through the memory locations in either the forward or reverse (back) direction. When the programmer is stepped to a state so that it addresses a given memory location, the number of that location 0–255 is indicated on a 3-digit decimal indicator 10. A single-pole single-throw momentary switch 12 is located between forward/back step switch 8 and indicator 10 for "rolling" the program counter through the address locations of the memory, that is, advancing continuously in the forward direction under clock control as long as this switch is held closed, and displaying the locations on indicator 10.

The programming panel is also provided with a pair of "enter" switches 14 and 16 shown in FIGS. 5 and 7b for entering into memory M the instruction data that has been set up on selector switches F1S, F2S and F3S. Switch 14 is a single-pole, double-throw momentary type having a center "off" position and a "partial parallels" position for entering the instructions regarding all except the last one of a plurality of contacts connected to the same output wire node, and a "series or last parallel" position for entering the instructions regarding series contacts and the last contact of a plurality of contacts connected to the same output wire node. Switch 16 is a single-pole single-throw momentary type having an off position and a "coil or output" position for entering the instructions regarding a control coil and an output from the ladder diagram.

The programming panel is also provided with a connector socket 18 into which is plugged the PC board on which the memory to be programmed is mounted. After this memory has been programmed in accordance with a desired program, the memory PC board is unplugged therefrom and plugged into a programmable controller chassis such as shown in my above copending application preparatory to running the controller.

The programming panel is further provided with three three-digit decimal indicators F1I, F2I, and F3I directly above the respective sets of selector switches for indicating the data which is read as soon as it is entered in the main memory M. Directly to the right of the F2I indicator are two lamps LP2 and LP3 for displaying the N.O. or N.C. state of the contact that has been programmed.

Moreover, this panel has symbols and legends that aid the person doing the programming in performing the necessary operations.

LADDER DIAGRAM PROGRAM

Before describing the operation of the programmer logic circuits, it will first be explained how the ladder diagram configuration of FIG. 1 is written into a program. FIG. 1 shows a simple ladder diagram that will serve for illustrative purposes. As shown therein, the left vertical is numbered "1" and the wire nodes toward the right along the "rungs" starting from the top are numbered "2", "3", etc. as is common practice in relay ladder diagrams. The programmable controller of my aforementioned copending application with which this programming panel may be used has a capacity for processing 1,000 wire numbers within a range of 0 to 999.

In this ladder diagram, the pushbuttons and lamp are I/O elements in the input-output section of the controller. The pushbuttons are numbered 003 and 004 and the lamp is numbered 020. The aforesaid controller has a capacity such that up to 400 such elements can be addressed in the I/O section over an address range of 000–399. This address range may overlap the wire number address range because they are in different multiplexed time fields so that there will be no interference as will become apparent.

The address range from 400–799 is used to address control coils in the control coil memory of the aforesaid controller. As shown in FIG. 1, the control coil is numbered 400 and each of its two contacts is also numbered 400. The control coil memory is actually the equivalent of an input-output device but having a capacity of the equivalent of 400 control coils. One bit, D11, in the control coil addressing word flags a N.O. or N.C. contact. If the contact is N.O., D11 is "0" and if the contact is N.C., D11 is "1". Use of bit "D11" in control coil contact field F2 for this purpose limits the maximum F2 instruction to 799.

Figure 6:
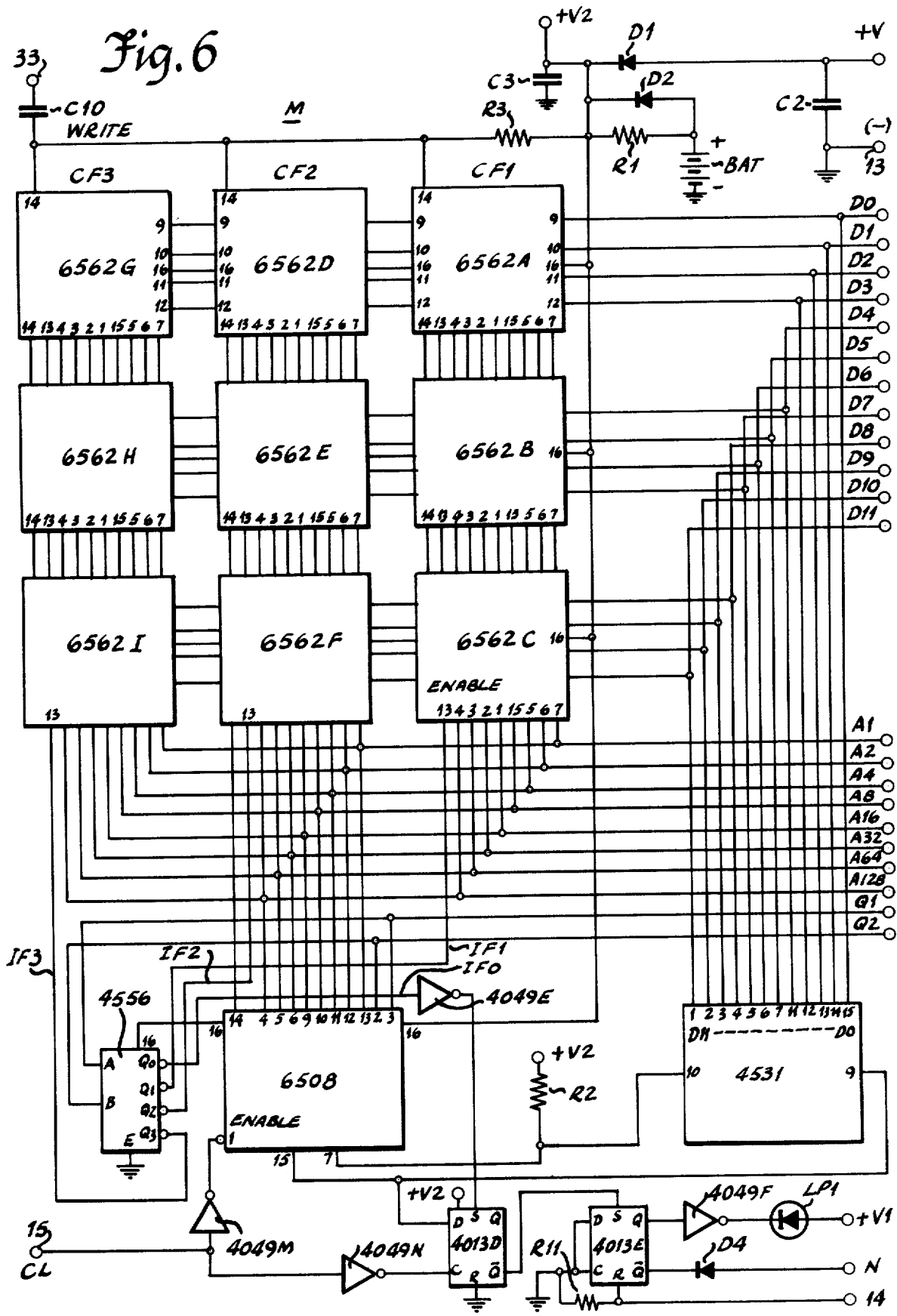
FIG. 6 is a logic diagram showing the details of the memory of FIG. 5.
Figure 10:
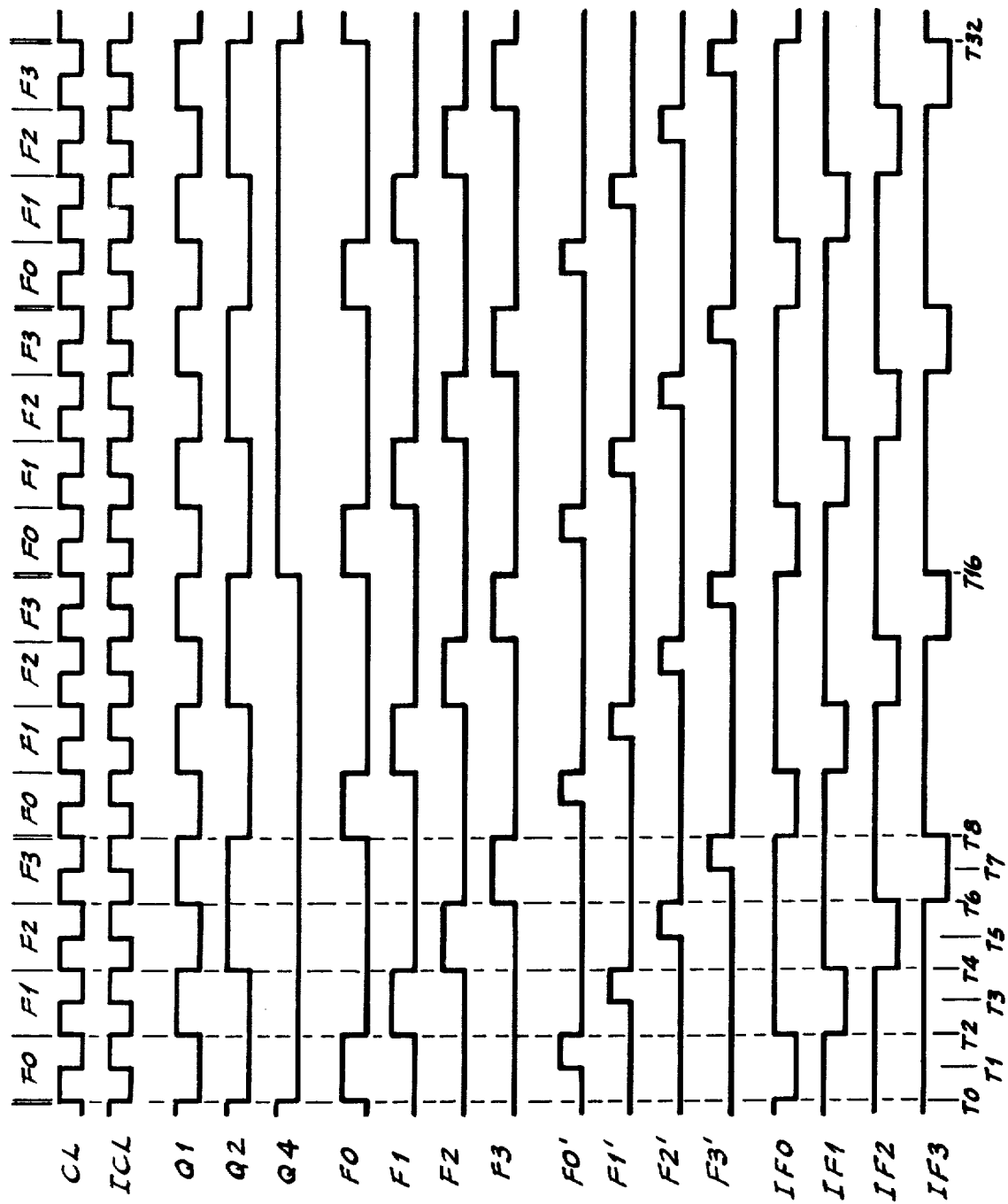
FIG. 10 is a timing chart showing operating characteristics of the programming panel of FIGS. 5, 6 and 7a-7e.

The ladder diagram configuration shown in FIG. 1 is written into a program as shown in FIG. 9. The left column shows the successive memory locations numbered in sequence from 000 to 005 and up to 255 if needed. FIG. 6 shows nine HM-6562 memory chips of the 256×4 CMOS RAM type arranged in three columns CF1, CF2 and CF3 having three chips, 6462A-C, 6562D-F, and 6562G-I in the respective columns. These columns of memory chips are identified as CF1, CF2 and CF3 to relate them to similarly identified multiplexed time slots F1, F2 and F3 hereinafter for convenience. Each chip has four bits bi-directional output and 256 locations so that the three chips in parallel in each column receive and provide 12-bit words. With the main memory having three columns of chips with three in each column, there is provided memory capacity of three 12-bit words for each memory location. That is, column CF1 has a 12-bit word in location 000, column CF2 has a 12-bit word in location 000, and column CF3 has a 12-bit word in location 000. With this memory arrangement, the input wire number 001 shown in the second column of FIG. 9 is stored in column CF1, location 000 of the memory in BCD form. The contact number 003 shown in the third column of FIG. 9 is stored in column CF2, location 000 of the memory in BCD form along with one "0" bit Q11 indicative of the N.O. character of the contact. And the special code shown in the last column of FIG. 10 is stored in column F3, location 000 of the memory. From this arrangement, it will be seen that the main memory can be addressed by multiplexing the same address in the three memory chip columns in sequence and then advancing to the next address.

TIMING CHART, FIG. 10

Before describing the operation of the programmer logic circuits in FIGS. 7a–7e, reference will be made to the timing chart shown in FIG. 10. This timing chart may be regarded as starting from the left edge of a clock pulse at time T1.

Figure 7C:
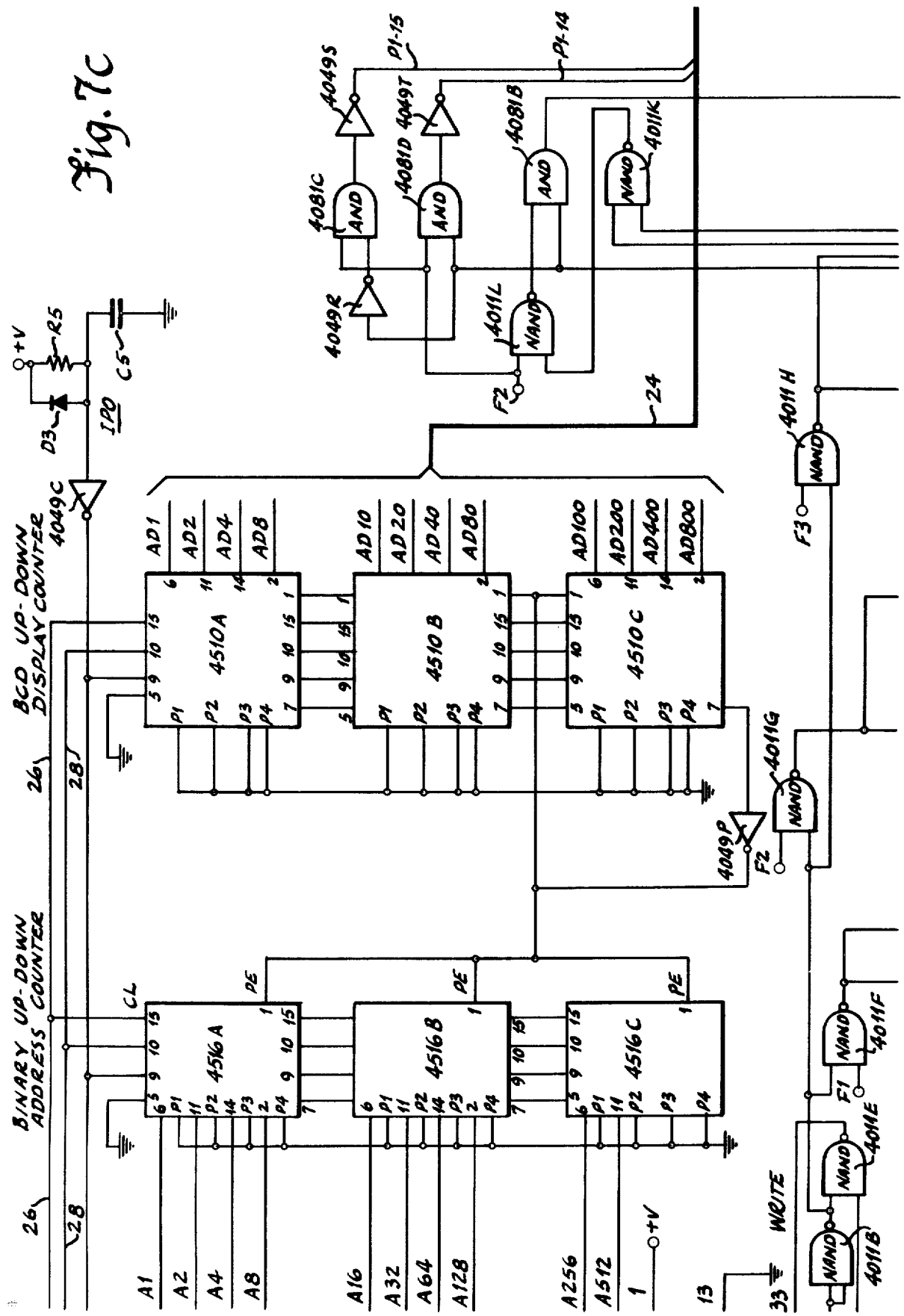

As shown in FIG. 10, a continuously running symmetrical oscillator, OSC in FIG. 7b, generates a clock signal CL and an inverted clock signal ICL. The clock signal is used for clocking the "roll" synchronizing flip-flop 4013A and the F' signal decoder 4555A in FIG. 7b and for controlling the parity check memory 6508 in FIG. 6 as hereinafter described. The inverted clock signal ICL goes negatively for the first half of each F period and positively for the second half thereof. The F periods are F0, F1, F2 and F3 as indicated at the top of FIG. 10 and repeat as shown therein. This inverted clock signal is used for running multiplexing binary counter 4024 in FIG. 7b which in turn also runs F decoder 4555B that produces the F periods referred to. This inverted clock signal also is used for clocking the write signal into the main memory as shown in FIGS. 7b and 7c.

The next three signals Q1, Q2 and Q4 are the first, second and fourth outputs of binary counter 4024. Signals Q1 and Q2 are the two least significant bits (LSB's) of binary counter 4024 and are used to run the aforesaid F decoder 4555B and also F' decoder 4555A, and are also sent to the main memory for the purpose of developing chip enable multiplex signals that are needed in both writing and reading of the memory as hereinafter described. The ROLL signal Q4 is the 960 Hz inverted clock signal divided by 16 in counter 4024 to provide a 60 Hz ROLL clock for continuously advancing or "rolling" through the memory locations in order to quickly reach a desired memory location.

The next four signals F0, F1, F2 and F3 in FIG. 10 are the outputs of the aforesaid F decoder 4555B in FIG. 7b that define the F fields or time periods shown at the top of FIG. 10 and are used for multiplex switching of the program data from the selector switches to both the memory and display.

THe next four signals F0', F1', F2' and F3' are the outputs of the aforesaid F' decoder 4555A in FIG. 7b controlled by clock CL and are used for performing timing operations in the programming logic circuit of FIGS. 7b–7e as hereinafter described.

The next four signals IF0, IF1, IF2 and IF3 are the outputs of decoder 4556 in FIG. 6 and are used for inhibit control (signal IF0) and for multiplex chip enable of the three main memory chip columns (signals IF1, IF2 and IF3).

GENERAL DESCRIPTION

In order to program the ladder diagram shown in FIG. 1, the program instructions are first written as shown in the table in FIG. 9. Then the power is turned on at switch 4 in FIG. 7a and the memory address counter which is the binary up-down counter in FIG. 7c is automatically reset to the memory zero location by initial power on circuit IP0 in FIG. 7c as hereinafter described. At the same time, the BCD up-down display counter in FIG. 7c will be reset by circuit IP0 along with the address counter to display the memory zero location 000 in decimal form. The selector switch sets F1S, F2S and F3S and N.O./N.C. switch 6 on the programming panel of FIG. 5 are then set as shown on the first line in FIG. 9. Following this; enter switch 14 is momentarily actuated to its "partial parallels" position since pushbutton contact 003 is the first contact of two parallel contacts. This causes instruction words 001 and 003-0 and the special code to be multiplexed into memory location 000 in the three memory chip columns CF1, CF2 and CF3 in BCD form and to be displayed on indicators F1I and F2I and lamp LP2. The special code will not be displayed on indicator F3I as such indication would be numerically meaningless. Upon release of enter switch 14, the memory address binary counter is automatically stepped to the next memory location and this memory location will be displayed on indicator 10 preparatory to entry of the next instruction word set.

This general procedure is then repeated for each line of the program in FIG. 9 except that the enter switches 14 and 16 in FIG. 5 are correctly actuated for last parallel, series, coil, series and output in that order following each setting of the program selector switches in order to correctly enter the data in the memory and to automatically insert the special code for OR function and output function programming purposes. The memory PC board is then unplugged from the programming panel and it will retain the program by its battery power. This memory board may then be plugged into the programmable controller chassis in order to execute the program as described in my aforementioned copending application.

In the above procedure, the left vertical wire 1 is assumed to be permanently "on" by having its logic wired-in within the programmable controller described in my aforesaid copending application. This eliminates the need for a special instruction therefor.

DETAILED DESCRIPTION—FIGS. 7a–7e

Referring to FIGS. 6 and 7a–7e, there are shown detailed logic diagrams of the main memory circuit and the programming logic circuits. The various IC (integrated circuit) logic elements will be identified and their functional characteristics will be described in connection with the description of operation of the programming system. The various IC's and other logic elements will be identified by their universal or generic, handbook identification numbers as most informative, using suffix letters to distinguish when there are more than one like IC in the system. For example, the 6562 memory chips in FIG. 6 are referenced as 6562A, 6562B, etc.

To operate the programming system, power is first connected thereto. This is done by closing power on switch 4 shown in FIGS. 5 and 7a. This causes A.C. power to be applied from power supply lines L1 and L2 through transformer T1 and a full-wave rectifier bridge BR1 to conductors 20 and 22. A filter capacitor C1 is connected across conductors 20 and 22. The B and C input terminals of an integrated circuit fixed-voltage regulator 7806 are connected across conductors 20 and 22 while the 7-volt D.C. output terminal E thereof is connected to positive D.C. voltage terminal +V. Conductor 22 is connected directly to the negative terminal or ground. These positive +V and ground terminals supply D.C. voltage to various points in the system of FIGS. 6 and 7b–7d as similarly referenced. A power-on indicator lamp LP0 is connected through a resistor R0 across the positive and negative terminals.

This D.C. voltage is applied at the top of FIG. 6 from terminal +V through diode D1 to power input terminals 16 of main memory chips 6562A–I and parity memory chip 6508. This D.C. voltage is filtered by capacitor C2 connected from terminal +V to ground. The D.C. current is applied from terminal +V through diode D1 and resistor R1 to trickle charge battery BAT. The cathode of diode D1 is connected to D.C. power output terminal +V2 and also through filter capacitor C3 to ground. This output terminal +V2 supplies positive D.C. voltage to terminal +V2 at the lower portion of FIG. 6 and through resistor R2 to parity selection input 10 of parity tree 4531 for purposes hereinafter described and to other D.C. power requirement points in this memory circuit (not shown). This D.C. voltage source +V also applies a "1" through diode D1 and resistor R3 to the write terminals 14 of main memory chips 6562A–I and parity memory chip 6508 to prevent any change in the data therein. When the memory PC board is unplugged from the programming panel or the programmable controller chassis, or if the power should dip or fail, battery BAT supplies retention power through diode D2 to prevent loss of the stored data.

MAIN MEMORY ADDRESSING

The purpose of main memory addressing is to access the locations in the main memory into which data or instruction words is to be written or to read data therefrom for display on the decimal indicators.

The main memory shown in FIG. 6 comprises nine 6562 memory chips of the aforesaid type having bi-directional data terminals for both writing and reading data. As shown in FIG. 6, these nine memory chips are arranged in three columns of three chips. Each having four data terminals, the three parallel chips in each column provide a 12-bit data input that is suitable for a 3-digit BCD code, four bits being assigned to each digit. The function of this memory module is to receive, store and later make available to a programmable controller the series of instruction words constituting the program representing the ladder diagram. For this purpose, this memory module may be of the RAM (random access memory), ROM (read only memory) or the PROM (programmable read only memory) type, or any other type suitable for the purpose. While a single group of nine memory chips is shown, it will be apparent that a single PC board may have a memory chip array of one of several different word capacities. While the memory shown has an 8-bit address input, the address counter of the programming logic has a 10-bit output to accommodate a double-size memory having 512 locations instead of the 256 locations memory shown.

From the foregoing, it will be apparent that main memory M in FIG. 6 has three memory locations at each address. That is, at address 000 there are three 12-bit data locations in chip columns CF1, CF2 and CF3. At address 001, there are another three 12-bit data locations, etc., through address 255.

The memory is programmed by storing 12-bit data words in the memory locations in sequence. This is done by running the program counter (address counter) which is the binary up-down counter in FIG. 7c to the desired memory locations, setting the data on the selector switches F1S, F2S and F3S and N.O.-N.C. switch 6 in FIG. 7c, and operating the appropriate enter switch 14 or 16.

The address counter comprises three 4516 presettable 4-bit binary up-down counter chips 4516A, 4516B and 4516C connected as shown in FIG. 7c to provide a 10-bit output A1, A2, A4, A8, A16, A32, A64, A128, A256, A512 for addressing the memory. The output of this counter advances in binary manner in response to count pulses at its clock terminal 15, the counting occurring on the positive going edge of the count pulse. This address counter applies positive voltage binary outputs to the memory. This counter counts up when its up-down terminal 10 is at "1" and counts down when it is at "0". In addition, this counter can be preset to zero by applying a combination of "0" signals from ground to its preset terminals P1–P4 on each chip 4516A–C and at the same time applying a positive voltage "1" on its preset enable terminals 1. This address counter is initially reset to zero output when a "1" reset signal is applied to its reset terminal 9.

This address counter is set from roll switch 12 or step switch 8 in FIG. 7b or may be reset to zero by turning power off and then on. Assuming that the address counter is not at a desired setting and that it is desired to address a given location of the memory, roll switch 12 is first closed to make a rough forward adjustment of the counter close to the desired setting. Closure of this roll switch causes a "1" to be applied to data input terminal 5 of D-type flip-flop 4013A whose reset terminal 4 is connected to ground to prevent direct resetting thereof. At time T0 in FIG. 10, the positive-going transition of clock pulse CL is applied to clock input 3 to set the flip-flop 4013A to "1" at its Q output 1. This "1" is applied to direct reset terminal 10 of D-type flip-flop 4013B to reset the latter even if the step switch should be closed at the same time thereby to prevent interference with the roll operation. This "1" is also applied to one input of NAND gate 4011A to enable the latter to pass the roll frequency.

This roll frequency is obtained from oscillator OSC through a seven-stage ripple counter 4024.

As shown in FIG. 7b, 960 Hz oscillator OSC comprises two inverter-buffers 4049A amd 4049B connected in series with the output of buffer 4049B being connected through a capacitor C4 to the input of buffer 4049A, and the output of buffer 4049B being also connected through capacitor C4 and a resistor R4 to its own input. The clock pulse CL and the inverted clock pulse ICL are taken from the outputs of buffers 4049B and 4049A, respectively.

Clock signal CL is applied to clock input 3 of synchronizing flip-flop 4013A, to enable input 15 of binary to 1-of-4 decoder 4555A, and to clock input 15 of the memory card connector slot from where it is used to control parity storage in the memory circuit of FIG. 6.

Inverted clock signal ICL is applied from the oscillator in FIG. 7b to generate the memory write signal and also to clock input 1 of binary ripple counter 4024. The negative-going transition of signal ICL shown in FIG. 10 advances the ripple counter to provide "1" outputs in binary form as shown by curves Q1, Q2 and Q4 in FIG. 10. The two LSB's (least significant bits) Q1 and Q2 of the binary counter are applied to run F' decoder 4555A of binary to 1-of-4 type to provide the control signals F0', F1', F2' and F3' during the latter halves of the F0, F1, F2 and F3 time periods as shown in FIG. 10, under the control of clock CL, these signals being free of counter 4024 propagation effects and being connected to various parts of the logic circuit in FIGS. 7b–7e for control purposes hereinafter described. These LSB's Q1 and Q2 are also applied to run F decoder 4555B of the binary to 1-of-4 type to provide control signals F0, F1, F2 and F3 that define the four fields or time periods shown at the top of FIG. 10 that are used for basic timing purposes in the programming. These LSB's Q1 and Q2 are further applied to inputs Z and 22 of the memory card connector slot and from there to the memory circuit of FIG. 6 where they provide multiplexing signals for parity inhibit and for memory addressing as hereinafter described.

The third LSB Q4 of the binary counter 4024 output divides the inverted clock 960 Hz frequency ICL by 16 as shown by curve Q4 in FIG. 10 to provide a 60 Hz roll signal to the other input of NAND gate 4011A. For each roll frequency pulse, NAND gate 4011A provides a "0" that is inverted to a "1" by NAND gate 4011B used as an inverter, and re-inverted to a "0" by NOR gate 4025B. As a result, the positive-going transition at the end of this "0" signal at time T16 in FIG. 10 provides the required positive-going transition of count input pulse at clock inputs 15 of the address and display counter to advance these counters. These counters then advance at the 60 Hz rate until the display indicates that near desired count has been reached by the program and display counters.

As shown in FIG. 7c, the display counter comprises three BCD up-down counter chips 4510A–4510C, each having a 4-bit BCD output, and connected so as to provide a 12-bit output suitable for three 4-bit BCD outputs corresponding to units AD1, AD2, AD3 and AD4, tens AD10, AD20, AD40 and AD80, and hundreds AD100, AD200, AD400 and AD800 digits outputs. The preset inputs P1–P4 of these display counter chips are connected to "0" at ground to allow holding the counter at zero when "1" is applied to preset enable terminals 1. The carry-in terminals 5 thereof also are connected to ground. Reset terminal 9 of this display counter receives an initial power-on reset "1" by a ground voltage from ground applied through capacitor C5 and inverted to "1" by inverter-buffer 4049C. The input to buffer 4049C comes from +V through resistor R5 and a diode D3 is connected across resistor R5 for fast discharge of capacitor C5 if power dips or fails, applying a positive-going transition to reset terminal 2 of ripple counter 4024 and to reset terminals 9 to reset the display and ripple counters to zero, and to terminal 14 to reset the parity flip-flop in FIG. 6 as hereinafter described. This display counter in turn resets the address counter to zero as hereinafter described. Carry-out terminal 7 of the display counter is connected to logic hereinafter described which prevents both counters from responding to a backward count from 000 to 999. Such a count if allowed to happen would cause loss of tracking since the binary counter would go to 1023 instead of 999.

As shown in FIGS. 7b and 7c, the same 60 Hz count signal that was applied to the address binary counter is also applied to clock input 15 of the BCD up-down display counter. As a result, the display counter counts up in step with the address counter in response to the roll frequency. The output of the display counter is sent through display bus 24 to FIG. 7e where it goes through three BCD-to-seven-segment decoder-drivers 74L47-1, -2 and -3 and then through current limiting resistor DIP's (dual-in-line packages) RDIP-1, -2 and -3 to 7-segment LED (light emitting diode) display 10, this display 10 being also shown on the programming panel in FIG. 5.

Now, when the address counter has been rolled to or near the desired memory location as seen on display 10, roll switch 12 is released to reopen.

When the ROLL switch is released to allow it to reopen, an "0" signal is applied from ground through resistor R6 to data input 5 of flip-flop 4013A. The next positive-going edge of a clock pulse CL is applied to clock input 3 to reset flip-flop 4013A so that its Q output goes to "0". This removes the reset signal from terminal 10 of flip-flop 4013B. The "0" on one input of NAND gate 4011A now holds its output at "1" regardless of the roll clock signal coming from output bit Q4 of the binary counter.

If the address counter is not exactly at the desired memory location, step switch 8 shown in FIGS. 5 and 7b is actuated momentarily one step at a time either forward or back to step the address counter to the desired memory location, except that a step back from 000 to 999 is not permitted as previously stated.

Assuming that the step switch is actuated to momentarily close its forward contact FOR, a "1" signal is applied from terminal +V through this forward step switch and then through a non-inverting buffer 4050A and a feedback capacitor C6 to debounce the signal, that is, eliminate any switch bounce effects from the signal. This signal "1" is then inverted to "0" in inverter 4049D and applied to one input of NAND gate 4011C used as a NOR gate. The other input of gate 4011C receives a "1" from NOR gate 4025A whose inputs at this time receive "0" from ground. As a result, the "1" output of NAND gate 4011C is applied to the data input 9 of a synchronizing D-type flip-flop 4013B. This synchronizing flip-flop is clocked to a set condition by the next F0' signal generated by decoder 4555A. For this purpose, signal F0' is applied to clock input 11 of flip-flop 4013B to set the latter so that a "1" appears at its Q output 13. This "1" is applied through resistor R7 to ground and also to one input of NOR gate 4025B. As a result, the output of NOR gate 4025B goes to "0" which is applied to clock inputs 15 of the address counter and the display counter. These counters do not, however, step yet since they require positive-going transitions of clock signals to step to the next position. This will come about upon release of the step switch as hereinafter described.

The purpose of the synchronizing flip-flops is to start the multiplexing of the memory chip columns CF1, CF2 and CF3 always from the beginning rather than in a random fashion. Therefore, if the address counter is advanced during the F0 period in FIG. 10, the system will be in readiness for multiplexing in sequence during the F1, F2 and F3 periods. For this purpose, when the step switch is released to return to OFF position, the address counter is stepped forward to the next count thereby to address the next memory location. To this end, "0" is applied from ground through resistor R8, buffer 4050A and inverter 4049D to apply a "1" to one input of NAND gate 4011C, the other input of the latter continuing to receive a "1" from NOR gate 4025A. As a result, the output of NAND gate 4011C goes to "0" which is applied to data input 9 of synchronizing flip-flop 4013B. The next F0' signal now clocks flip-flop 4013B at its clock input 11 to its reset stage where its Q output goes to "0". This "0" is inverted to "1" in NOR gate 4025B to obtain the positive-transition signal at clock terminals 15 of the address and display counters to advance these counters to the next position.

If it is desired to step the address counter backwards to zero or to the desired position, step switch 8 is momentarily actuated to its BACK position from its OFF, open position. As a result, voltage +V is applied through this switch and resistor R9 to ground thereby applying a "1" through buffer 4050B and feedback capacitor C7 to debounce the contact operation, and then to data input 5 of synchronizing D-type flip-flop 4013C. Signal F0' clocks this flip-flop to its set state whereby a "1" is applied from its Q output through resistor R10 to ground and also to NOR gate 4025B. This causes a "0" from the output of this NOR gate to be applied through conductor 26 to clock inputs 15 of the address and display counters. This "1" from the flip-flop Q output is also applied to an input of NOR gate 4025C which is the reversing gate for the up-down counters. The resultant low output "0" from this NOR gate discharges delay capacitor C8 preparatory to stretching the reverse signal past the count signal to insure that the counters will step in the reverse direction. Counting back requires a low signal "0" on up-down inputs 10 of the address and display counters. When the step switch is released to allow it to reopen, a "0" signal is applied from ground through resistor R9 and buffer 4050B to data input 5 of flip-flop 4013C. The next F0' signal, see FIG. 10, clocks synchronizing flip-flop 4013C back to its reset state so that its Q output goes to "0". This "0" is applied to both count NOR gate 4025B and reverse NOR gate 4025C. As a result, count NOR gate 4025A provides a positive-transition pulse through conductor 26 to clock inputs 15 of the address and display counters to step these counters in the reverse direction. While the aforesaid "0" input causes the output of reverse NOR gate 4025C also to go to "1", capacitor C8 charges to delay the rise of the voltage on conductor 28 past the positive-transition count pulse on conductor 26 to insure that the "down" count action takes place before the steering signal (reverse) is removed from up-down inputs 10 of the address and display counters.

The address and display counters are now in their zero or desired positions. The address counter addresses the desired or zero (00000000) location of the main memory through the eight LSB's of the address counter output bus, that is, conductors A1, A2, A4, A8, A16, A32, A64 and A128. The two MSB's (most significant bits) at conductors A256 and A512 of the binary counter output are not required with the memory shown in FIG. 6 but are reserved for use with larger memories, for example, a similar memory but having two sets of nine memory chips. The display counter BCD outputs on display bus "units" conductors A1, A2, A4 and A8, "tens" conductors A10, A20, A40 and A80, and "hundreds" conductors A100, A200, A400 and A800 are applied through BDC-to-seven-segment decoders-drivers 74L47-1, -2, and -3 and current limiting resistor DIP's RDIP-1, -2 and -3 to three 7-segment LED displays 10 to display the memory location in three decimal digits 000.

MAIN MEMORY ADDRESSING

The purpose of memory addressing is to store instruction words of the program therein and to read these instruction words when it is desired to put them on display on indicators F1I, F2I (LP2, LP3) and F3I on the programming panel.

As shown in FIG. 6, the binary output of the address counter of FIG. 7c comes in at the memory card connector slot terminals to conductors A1, A2, A4, A8, A16, A32, A64 and A128 and the binary address number thereon is applied to the address inputs of all nine main memory chips 6562A-6562I. This addresses the same numbered location in all three chip columns CF1, CF2, and CF3. However, it is also necessary to apply enable signals to the three chip columns in multiplexing sequence to complete the addressing for reading purposes or to apply such enable signals to the three chip columns in sequence along with a common write signal in order to write instruction words in multiplexing fashion in the main memory.

This multiplexing is done by binary to 1-of-4 decoder 4556 in FIG. 6 under the control of LSB's Q1 and Q2 of seven-stage ripple, binary counter 4024 of FIG. 7b. As hereinbefore mentioned, the two LSB's Q1 and Q2 (FIG. 10) of this counter are applied to the memory card connector slot and then through the similarly characterized terminals Q1 and Q2 in FIG. 6 to inputs A and B, respectively, of decoder 4556. As a result, this decoder provides the four output signals IF0, IF1, IF2 and IF3 shown at the bottom of FIG. 10. It will be seen therein that when inputs A and B of decoder 4556 are "0" (counter outputs Q1 and Q2), the decoder provides on output signal IF0 of "0", this being an inverting decoder. At binary count 1, when decoder input A is "1", the decoder provides an output signal IF1 of "0", all other outputs being at "1". At binary count 2, when decoder input B is "1", the decoder provides an output signal IF2 of "0", all other outputs being at "1". And at count 3, when decoder inputs A and B are "1", the decoder provides an output signal IF3 of "0", all other outputs being "1".

Of these multiplex decoder 4556 outputs, first signal IF0 is used as an inhibit signal and the remaining three signals IF1, IF2 and IF3 are used to multiplex like numbered locations in the three chip columns of the main memory. This first signal IF0 in FIG. 6 is inverted in inverter 4049E to apply a "1" during the F0 period (FIG. 10) to direct set terminal S of parity error sensing D-type flip-flop 4013D to put this flip-flop in its set state wherein its $\overline{Q}$ output is in "0" state so as not to direct set parity error indicating flip-flop 4013E which is reset when power on switch 4 in FIG. 7a is first closed. For this purpose, initial-power-on circuit IP0 in FIG. 7c resets this flip-flop 4013E. When power is first applied, a "0" is applied from ground in FIG. 7c through capacitor C5 and inverted to a "1" by inverter 4049C and applied not only to input 9 to reset the display counter and input 2 to reset ripple counter 4024 but also to initial-power-on terminal 14 of the memory card connector slot in FIG. 7b. From there this "1" is applied through terminal 14 at the lower portion of FIG. 6 through resistor R11 to ground and to reset terminal R of flip-flop 4013E to place the latter in its reset state wherein its Q output is "0" and its $\overline{Q}$ output is "1". As a result, lamp LP1 will be out since the output of inverter 4049F will be "1". The $\overline{Q}$ output is not used herein but is used through diode D4 to terminal N for shutdown when this memory is used in a programmable controller as described in the aforementioned copending application.

The remaining three signals IF1, IF2 and IF3 of the multiplex decoder 4556 output in FIG. 6 are connected to enable terminals 13 of main memory chip columns CF1, CF2 and CF3, respectively. Thus, it will be seen that this decoder multiplexes like-numbered locations in the three memory chip columns in succession to enable writing and reading of the data therein during time periods F1, F2 and F3 as shown by the curves in FIG. 10.

PROGRAMMING THE MEMORY

To store the program shown in FIG. 9 in the main memory, selector switches F1S, F2S and F3S shown in FIGS. 5 and 7d are first set to the numbers shown on the first line in FIG. 9. N.O.-N.C. switch 6 at the lower portion of FIG. 7d is left open since pushbutton contact 003 is normally-open. Selector switch F3S may be left at zero or set at 002 because in either case the special code of all 1's will be stored in memory field location F3. This is because pushbutton contact 003 in FIG. 1 is a parallel contact other than the last parallel contact. The data codes that will actually be stored in the main memory in BCD code, that is, four binary bits for each decimal digit set up on the selector switches, are as follows, accompanied by parity indication as hereinafter described:

| SET | PERIOD | DATA CODES HUN-DREDS | TENS | UNITS | ODD EVEN | PARITY BITS |
|---|---|---|---|---|---|---|
| 1 | F1 | 0000 | 0000 | 0001 | odd | 0 |
|   | F2 | 0000 | 0000 | 0011 | even | 1 |
|   | F3 | 1111 | 1111 | 1111 | even | 1 |
| 2 | F1 | 0000 | 0000 | 0001 | odd | 0 |
|   | F2 | 0100 | 0000 | 0000 | odd | 0 |
|   | F3 | 0000 | 0000 | 0010 | odd | 0 |
| 3 | F1 | 0000 | 0000 | 0010 | odd | 0 |
|   | F2 | 0000 | 0000 | 0100 | odd | 0 |
|   | F3 | 0000 | 0000 | 0011 | even | 1 |
| 4 | F1 | 0000 | 0000 | 0011 | even | 1 |

| SET | PERIOD | -continued DATA CODES HUN-DREDS | TENS | UNITS | ODD EVEN | PARITY BITS |
|---|---|---|---|---|---|---|
|   | F2 | 1111 | 1111 | 1111 | even | 1 |
|   | F3 | 0100 | 0000 | 0000 | odd | 0 |
| 5 | F1 | 0000 | 0000 | 0001 | odd | 0 |
|   | F2 | 0100 | 0000 | 0000 | odd | 0 |
|   | F3 | 0000 | 0000 | 0101 | even | 1 |
| 6 | F1 | 0000 | 0000 | 0101 | even | 1 |
|   | F2 | 1111 | 1111 | 1111 | even | 1 |
|   | F3 | 0000 | 0010 | 0000 | odd | 0 |

As shown above, the first set of three codes is set up on the selector switches. The N.O.-N.C. switch 6 is left open throughout this program since there are no N.C. control contacts in the ladder diagram of FIG. 1. Pushbutton contact 004, although normally-closed, is an input element whereas switch 6 is to be set only for control contacts such as control coil contacts 400. Following this selector switch setting, enter switch 14 shown in FIGS. 5 and 7b is momentarily pushed upwardly to its "partial" position. A "1" is applied from the +V terminal through this switch and resistor R12 to ground. This "1" switch action is also debounced in buffer 4050C and feedback capacitor C9 and then applied through conductor 30, inverted to "0" by inverter 4049G and applied to resistor R13 which is small compared to resistors RDIP-4 and connected to +V voltage. As a result, "0" signals are applied through resistors RDIP-4 to all outputs of selector switch F3S regardless of the setting of switches F3S. At the same time, "1" signals are applied from voltage +V through resistors RDIP-5 to all outputs of selector switch F1S except output 1 to which a signal "0" is applied from ground since this contact is closed as indicated by the F1 code above. Also at the same time, "1" signals are applied to all switch F2S outputs from +V through resistors R14 and RDIP-6 except outputs 1 and 2 to which "0" signals are applied from ground as indicated by the F2 code, set 1 above. These "1" and "0" signal codes are applied through respective data channels of two of the hex inverter-buffers 4502A-4502F to the 12-bit data bus D0–D11. As the name hex implies, each such hex inverter-buffer has six units with individual inputs 3, 6, 1, 10, 13 and 15 and respective outputs 5, 7, 2, 9, 11 and 14, and a common disable input 4 that controls the passage of six bits of data therethrough to the 12-bit data bus having conductors D0–D11 to both the main memory and the display. While each such hex inverter-buffer has actually only one set of outputs, two sets have been shown for convenience of drawing the parallel connections therebetween, as is the case with several other IC's in these drawings.

At the same time, the "1" signal from the "partial" position of the enter switch is applied to NOR gate 4025A and its "0" output is applied to NAND gates 4011C and 4011D, the latter being used as an inverter to change the "0" to a "1" signal. This "1" signal is applied to one input of NAND gate 4011E to obtain a write signal and to one input of each of NAND gates 4011F, 4011G and 4011H to preset the latter for multiplexing the data into the memory. Referring to FIG. 10, it will be seen that during the F1 period, the F1 signal will be applied to NAND gate 4011F to cause its output to go to "0", thus removing the disable from disable terminals 4 of hex inverter buffers 4502A and 4502B. This allows the data set up on selector switches F1S to pass through the data bus to the main memory for the duration of the F1 period.

At the same time, inverted clock ICL is applied to the other input of NAND gate 4011E whose resultant output "0" is applied as a write signal to terminal 33 of the memory at time T3 in FIG. 10 during the latter part of the F1 timing period. Referring to FIG. 6, it will be seen that this write signal "0" goes from terminal 33 through coupling capacitor C10 to write inputs 14 of all nine main memory chips 6562-I and parity memory chip 6508. However, only the chips in column CF1 are enabled at this F1 period by multiplexing signal IF1. As a result, the data on selector switches F1S is written into the memory.

This data is also displayed on the indicators in FIG. 7e. The data inputs to the memory are bi-directional so that the data that has been stored will be read each time that the corresponding chip column CF1 is enabled by multiplexing decoder 4556. This data is read from the memory onto data bus D0–D11 during the F1 period by multiplexing signal IF1 shown in FIG. 10 and applied to BCD-to-seven-segment decoder-drivers 74LS47-1, -2 and -3 in FIG. 7e. During the F0 period, a blanking signal is applied to these decoder-drivers to blank out any data passage therethrough. For this purpose, the F0 signal is inverted to "0" in inverter 4049H and applied to ripple blanking inputs 5 of the decoder-drivers. Thus, these decoder-drivers will pass data only at times F1, F2 and F3 when data is being read from the memory. This data is passed through current limiting resistors RDIP-7, -8 and -9 to wire number indicators F1I. The BCD data are decoded in groups of four, corresponding to decimal digits, into seven outputs which are then sent to seven-segment LED (light emitting diode) displays.

These displays F1I, F2I and F3I are multiplexed by the F1', F2' and F3' timing signals shown in FIG. 10 so that the displays will be activated during the latter halves of the F1, F2 and F3 periods. For this purpose, transistors TR1, TR2 and TR3 are connected from voltage +V to displays F1I, F2I and F3I. The F1', F2' and F3' signals are inverted by inverters 4049J, 4049K and 4049L and applied to the bases of these transistors to turn them on during the respective F1', F2' and F3' periods.

From the foregoing, it will be apparent that the F2 signal will be inverted in NAND gate 4011G to remove the disable signal from hex inverter-buffers 4502C and 4502D during the F2 period and memory chip column CF2 will be similarly enabled by signal IF2 and the write signal will be applied to store the data from selector switches F2S into the memory. During the F3 period, the data from selector switches F3S will be similarly stored in the memory in chip column CF3 under the control of signal F3 in FIGS. 7c and 7d. And this data will activate the displays repeatedly during the latter halves of the F2 and F3 periods under the control of the signals shown in FIG. 10.

When partial enter switch 14 was closed as aforesaid, it will be recalled that a "0" signal was applied to one input of NAND gate 4011C in FIG. 7b. The other input of this NAND gate receives a "1" from inverter 4049D. The resultant "1" from NAND gate 4011C sets flip-flop 4013B under clock F0' control producing a "1" output inverted to "0" by NOR gate 4025B and applied to the address and display counters. When enter switch 14 is released to allow it to reopen, synchronizing flip-flop 4013B will be reset by the F0' signal to provide a positive-transition pulse at clock terminals 15 of the address and display counters to advance these counters one step up. Thus, the program counter is automatically advanced one step following each instruction word storage into readiness for storing the next instruction word at the next memory location or address.

As shown in FIG. 9, the program counter has now moved to memory location 001 and the second line of data may be set on the selector switches. Since this is the final one of parallel contacts, enter switch 14 is momentarily actuated downwardly to its "last parallel" position to enter the data in the memory. Resistor R15, buffer 4050D and feedback capacitor C11 function as hereinbefore described and the data is stored in the memory. This operation differs in that the enter switch signal goes only to NOR gate 4025A and no signal is sent out on special code conductor 30.

The third instruction code is then similarly stored in memory location 002.

The fourth instruction is an output instruction so that enter switch 16 must be momentarily actuated closed following setting of the selector switches. Resistor R16, buffer 4050E and feedback capacitor C12 function as before to pass the enter switch signal both to NOR gate 4025A and also out on special code conductor 32. This signal is inverted in inverter 4049J to apply the special code of all 1's to the outputs of the F2S selector switches for storage in the memory. A characteristic of BCD-to-seven segment decoder-drivers 74LS47-1, -2 and -3 is that an input of all 1's will turn all the outputs thereof off thereby to blank the display. This conveniently avoids display of the special code as an instruction word.

PARITY CHECK

Parity checking is done to determine whether the instruction words that are read from the main memory are identical as to the number of "1" bits to the instruction words that were stored therein. Parity means the quality of being equal. For this purpose, the memory board is provided with a 12-bit parity tree 4531 and a 1024×1 RAM parity memory 6508 as shown in FIG. 6. This parity tree is a 4531 logic circuit known as a parity generator having 12 data inputs D0–D11, an even or odd parity selection input 10, and an output 9. If the signal to parity selection input 10 is "0", the output will be "0" for an even number of data inputs "1" and will be "1" for an odd number of inputs "1". On the other hand, if the signal to parity selection input 10 is "1", the output will be "1" for an even number of data inputs "1" and will be "0" for an odd number of data inputs "1". Thus, it will be seen that a signal "1" on parity selection input 10 in effect inverts the output.

Let it be assumed that when the program is being stored in the memory, as each data code is introduced into the main memory at its input-output terminals D0–D11, each data code is also applied to the 12-bit data inputs of parity circuit 4531 to provide the resultant output. The program is stored in the memory one instruction word at a time by addressing the memory locations, enabling the chips by a multiplex signal at terminal 13, and applying a write signal to terminal 14 as hereinbefore described. In order to store such data codes in the main memory, it is necessary for the binary address counter to address the locations in the main memory. These same address codes are simultaneously applied to the ten address inputs of parity memory 6508 to address the locations thereof preparatory to storing parity circuit output bits therein. Each time the program data code contains an even number of "1" bits, and with "1" being applied from voltage terminal +V2 through resistor R2 to parity selection input 10, the resultant "1" output at terminal 9 of parity tree 4531 is applied to data input 15 of parity memory 6508 and is stored in the corresponding location of memory 6508 under the control of clock signal CL through inverter 4049M to its enable input 1 and a write signal from terminal 33 to its write input 14. On the other hand, each time the program data code contains an odd number of "1" bits, and with "1" being applied from voltage source +V2 to parity selection input 10, the resultant "0" output is stored in the corresponding location of memory 6508. The data codes that are stored in the main memory in BCD code, are as shown above, that is, four binary bits for each decimal digit, accompanied by an indication of whether the number of "1" bits in each code is odd or even. The right-hand column shows the parity bit that is stored in parity memory 6508 for each data code.

When the memory is subsequently read, the parity bit is also read from memory 6508 and its output is applied to parity selection input 10 of circuit 4531 to maintain the parity output at terminal 9 thereof at "1". For this purpose, when the main memory is addressed and the first instruction code shown above read therefrom, the parity memory 6508 is also addressed by the same address code and the "0" for odd or "1" for even parity bit read and applied to parity selection input 10 of circuit 4531. This is done by applying clock CL from terminal 15 in FIG. 6, inverting the positive-going leading edge thereof, time T2 in FIG. 10, in inverter 4049M and applying it to terminal 1 of memory 6508 to enable it.

At the same time, the instruction code that was read from the main memory is applied to the 12-bit inputs of parity circuit 4531 as shown in FIG. 6. If the instruction code has an odd number of "1" bits (the first code above has an odd number), and a "0" is read from memory 6508 and applied to parity selection input 10, the parity tree will provide a "1" output from terminal 9 to data terminal D of flip-flop 4013D. Also, if the instruction code has an even number of "1" bits (the second code above has an even number), and a "1" is read from memory 6508 and applied to parity selection terminal 10, the parity tree will provide a "1" output from terminal 9 to data terminal D of flip-flop 4013D.

Immediately thereafter, at time T5, FIG. 10, a clock pulse CL is applied from terminal 15 to gate flip-flop 4013D at its clock terminal C. The negative-going part of this clock pulse is inverted to positive-going by inverter 4049N at time T3 to gate the flip-flop. However, this flip-flop 4013D remains in its set state to which it was set by the inhibit during the F0 period if there is no error as hereinbefore described.

In case of error in the instruction reading, the parity circuit will light lamp LP1 so that erroneous instructions will not be stored. If the read word contains an even number of "1" bits when the correct number is odd, or vice versa, the output of parity tree 4531 will go to "0" whereafter the inverted clock pulse will gate flip-flop 4013D to its reset state. This causes its $\overline{Q}$ output to go to "1" which is applied to direct set terminal S of flip-flop 4013E to operate the latter to its set state. As a result, the "1" output at its Q terminal is inverted to "0" by inverter 4049F to light indicator LP1 as an indication of error.

PROGRAM COUNTER TRACKING

It will be recalled from the foregoing description that the memory address counter in FIG. 7c is a binary up-down counter in order to provide binary addressing of the main memory. On the other hand, the display counter is a BCD up-down counter in order to provide decimal display of the memory locations as they are addressed. These two counters operate in step, up from 000 to 999 and down from 999 to 000. However, since the 10-bit binary counter has a count capacity of 0 to 1023 while the BCD counter has a count capacity of 0 to 999, means is provided to prevent the binary counter from stepping out of count synchronism with the BCD counter at the recycle point, that is, when the BCD counter is attempted to be reverse-stepped from 000 to 999 in the "down" direction. Otherwise, the binary counter would go "down" from 000 to 1023 while the BCD counter recycles from 000 to 999.

FIG. 7c shows the counter circuit that solves the "up" tracking problem when going forward from 999 to 000 in decimal count. The BCD counter will recycle up from 999 to 000, and then count 001, 002–023 while the binary counter steps in binary equivalent from 999 to 1000 and then counts 1001, 1002–1023. The person doing the programming will be informed to know that up from 999, decimal indications 0–23 mean binary counts 1000–1023. This avoids having to introduce additional logic elements for exact indication of binary counts 1000–1023 that are seldom used.

FIG. 7c also shows the logic circuit that solves the "down" tracking problem by holding both counters at zero when stepping back from 000 to 999 is attempted. When stepping in the reverse direction, it is necessary to sense a count of 000 on the BCD counter and to hold the binary counter to the binary equivalent of 000 and to hold the BCD counter at 000. Let it be assumed that a reverse step action is performed, attempting to step the BCD counter from 000 to 999. Instead of using separate logic to sense the decimal counter being at zero, advantage is taken of the inherent characteristics of the counter itself to obtain the equivalent action. A characteristic of the BCD counter is that if it is at 000 and is forced to "reverse" state, a carry output signal will be generated. This carry output signal may then be used to override the count signal and hold both counters at zero. As the step switch is momentarily actuated, the up-down input 10 of the BCD counter will go to "0" which is the down or reverse signal. This will cause a carry-out signal "0" to be generated from output 7 of the BCD counter. This "0" carry-out signal is inverted to "1" by inverter 4049P and applied to preset enable inputs 1 of the binary counter and BCD counter units. This will hold both counters at whatever value is set up on the preset inputs. As shown in FIG. 7c, a "0" is connected from ground to all preset inputs P1–P4 of the three 4-bit binary counter units 4516A, -B and -C and BCD counter units 4510A, -B and -C. Therefore, when the preset enable signal is applied to terminals 1 of the three units of each counter from the carry-out of the BCD counter as hereinbefore mentioned, both counters will be held at count 000 rather than stepping to their normal counts 1023 and 999, respectively.

N.O.-N.C. CONTACT DISPLAY—FIGS. 7c–7e

As hereinbefore mentioned, the MSB of the F2 field of the instruction word is used as a N.O.-N.C. flag and indicator for contact instructions. This is set at switch 6 at the lower portion of FIG. 7d and also shown on the programming panel in FIG. 5. This bit which would otherwise be the 8 bit of the hundred's (H) BCD code is not needed for the F2 field contact code because the control contacts are limited to the number range of 400–799. Thus, only the three LSB's 1, 2 and 4 of the hundred's BCD code are needed to define the largest required hundreds digit of 7. This switch 6 is left open for a N.O. contact and is closed for a N.C. contact.

The logic circuit at the right-hand portion of FIG. 7c is provided to block this N.C. bit from getting involved in the display of the F2 field for contact instructions because otherwise it would add 8 to the F2 contact instruction for an erroneous display. However, this bit is stored in the memory to make it available later for use in the programmable controller. Furthermore, this bit must be allowed to go through to the display for the output instruction where the special code of all 1's is used in the F2 field. The reason for using all 1's is that, due to an inherent characteristic of BCD-to-seven-segment decoders-drivers 74LS47-1, -2 and -3, this will automatically "blank" the display, that is, all outputs of the decoder-drivers go "off".

To block the N.C. bit "1" from the display, it will be seen that when switch 6 is closed, a "0" is applied from ground to hex inverter-buffer 4502C where it is inverted to a "1" on data bus conductor D11 and applied to one input of AND gate 4081B. The other input of this AND gate 4081B receives a "0" input during the F2 time period providing a "0" output so that the N.C. "1" bit will not be passed through data conductor D11' to the display. For this purpose, NAND gate 4011K keeps such other input of AND gate 4081B at "0". It will be apparent that the two inputs to this NAND gate 4011K are taken from lines D6 and D7 of the data bus. These two data lines cannot both be at "1" for any BCD code because they represent bits 4 and 8 of the tens (T) contact digit which is greater than the largest BCD digit 9. Consequently, with a "1" on only one input or none of the inputs, the output of NAND gate 4011K will be "1". This "1" is applied to one input of NAND gate 4011L which receives its other input "1" from the F2 signal shown in FIG. 10. This keeps the output of NAND gate 4011L and in turn the aforementioned other input of AND gate 4081B at "0" thereby to block the N.C. bit for the duration of the F2 time period during which the contact instruction code number is energized in a multiplex manner. This will prevent the N.C. bit from interfering with the contact number display.

Instead, the N.O. and the N.C. state of the contact program will be indicated by lamps LP2 and LP3 at the upper left portion of FIG. 7e, these lamps being also shown on the programming panel in FIG. 5. For the N.O. state of a contact, switch 6 is open. Consequently, a "1" signal is applied from +V voltage in FIG. 7d through resistors R14 and RDIP-6 to hex inverter-buffer 4502C, which inverts it to "0" on data bus line D11. This signal is inverted to "1" in inverter 4049R and applied to one input of AND gate 4081C whose other input is gated by the F2 signal. The "1" output of this AND gate 4081C is inverted to "0" in inverter 4049S to apply a "0" on conductor P1-15 to lamp LP2. Since +V voltage is applied to the other side of this lamp, filtered by capacitor C13, the lamp will be lit to indicate the N.O. setting of switch 6. On the other hand, when switch 6 is closed for a N.C. contact, a "0" is applied from ground therethrough to hex inverter-buffer 4502C, resulting in a "1" on data bus line D11, which is applied to one input of AND gate 4081D. The other input of the latter is gated by the F2 signal to provide a "1" output, inverted to "0" by inverter 4049T and applied through conductor P1-14 to light N.C. lamp LP3, thus to indicate the programming of a normally-closed contact. The N.O. logic 4049R, 4081C and 4049S blocks the N.C. signal and the N.C. logic 4081D and 4049T blocks the N.O. signal on data bus line D11 from the corresponding indicator lamps.

As hereinbefore mentioned, the D11 bit, although blocked from the data display for contact instructions, must be passed through to the BCD-to-7-segment decoder-driver 74LS47-3 for the special code of all 1's in order to "blank" the display for the special code on output instructions. For this purpose, it is necessary to sense the special code of all 1's. While this may be done in a number of different ways, a simple way to do it is to use the same NAND gate 4011K that was used to sense the BCD code condition for N.C. "1" bit blocking as hereinbefore described. Data lines D6 and D7 are sensed because they cannot both be "on" or "1" except for a non-decimal code since they are the BCD 4 and 8 bits of the F2 field code. All 1's is the only non-decimal code used herein thus allowing this simple way to sense it. Having two 1's at its inputs, NAND gate 4011K provides a "0" signal to one input of NAND gate 4011L which is the inverse of what was provided previously for N.C. D11 bit blocking. Consequently, NAND gate 4011L applies a "1" to one input of AND gate 4081B. Since the D11 bit of the special code of all 1's is applied to the other input, AND gate 4081B passes on a "1" bit through line D11' to BCD-to-7-segment decoder-driver 74LS47-3 to afford the requisite blanking of the outputs thereof. That is, for four 1's input, all outputs of decoder-drivers 74LS47-1, -2 and -3 are off.

While the apparatus hereinbefore described is effectively adapted to fulfill the objects stated, it is to be understood that the invention is not intended to be confined to the particular preferred embodiment of memory programming control system disclosed inasmuch as it is susceptible of various modifications without departing from the scope of the appended claims.

I claim:

1. A programmer for wire number programming of the elements of a plural-rung ladder diagram in random order, said rungs having any desired numbers and combinations of control elements such as input devices and series and/or parallel contacts, and each rung terminating in a controlled element such as a control coil or output device comprising:

a read-write memory having a plurality of data word set storage locations;

encoding means operable to encode a wire number program for said plurality of rungs of the ladder diagram comprising a first data word set comprising the input wire number to a first element, the first element number, and the output wire number from the first element when said first element is either a series element or the last one of a group of parallel elements or no output wire number when said first element is other than the last one of a group of two or more parallel elements;

said encoding means being further operable following entry of said first data word set in said memory to encode a second data word set comprising the input wire number to a second element that is the same as said output wire number from the first element when said first element is either a series element or the last programmed one of a group of parallel elements or is the same as said input wire number to said first element when said first and second elements are parallel elements, the second element number, and the output wire number from the second element when said second element is either a series element or the last one of a group of parallel elements or no output wire number when said second element is other than the last programmed one of a group of two or more parallel elements or a controlled element;

said encoding means being further operable to encode similarly three-data-word sets for any desired number of series elements and the last one of a group of parallel elements or two-data-word sets for any desired number of additional elements that are other than the last programmed one of a group of parallel elements or controlled elements;

said programming being subject to the requirement that the programming may be random as to the data word sets in different rungs with the limitation that the programming of each rung must be unidirectional and progressive toward its controlled element with respect to the data word sets of series elements and groups of parallel elements but need not be successive with respect to the data word sets of any given rung;

selectively-operable entry control means;

and logic circuit means responsive to selective operation of said entry control means following each said encoding of a data word set for storing the respective data word set in a predetermined plural data word location in said memory with the plural data word locations for the successively encoded data word sets being in advancing relation in said memory;

and special code generating means comprising first code generating means for generating a first code indicative of an OR-logic instruction whenever any control element but the last one of a plurality of parallel control elements is stored in the memory.

2. The programmer for wire number programming of the elements of a plural-rung ladder diagram claimed in claim 1, wherein, said special code generating means comprises second code generating means for generating a second code indicative of an output instruction whenever a controlled element instruction is stored in the memory.

3. The programmer claimed in claim 1, wherein:

said encoding means comprises a switch operable to program the normally-open or normally-closed state of the control element being programmed along with said control element number code;

said programmer system also comprises wire number program display means;

and display control logic circuit means responsive to said logic circuit means for operating said wire number program display means for displaying said wire number program upon storage thereof in said memory.

4. The programmer claimed in claim 3, wherein;

said programmer system comprises separate display means for indicating said normally-open or normally-closed state program of said control element and for preventing the same from being added to said wire number program being displayed.

5. The programmer for wire number programming of a ladder diagram claimed in claim 1, wherein said programmer also comprises:

a programming panel mounting said programmer;

said read-write memory having a multiplicity of addresses and a plurality of said data word locations at each address for storing multi-bit instruction words in order to direct logic functions when used in a programmable controller;

means comprising electrical connector means affording plug-in connection of said memory on said programming panel to electrically connect it to the programmer therein;

manually-controllable counter means comprising a program counter for selectively addressing said memory;

said encoding means comprising manually-settable means for encoding a plurality of instruction words to be stored in succession in the respective instruction word locations at one address;

a continuously running clock;

means controlled by said clock for repeatedly multiplexing said plurality of instruction word locations at said one address and for also multiplexing said plurality of instruction words from said manually-settable means, respectively, to said memory;

and means controlled by said selectively operable entry control means and said clock for writing said instruction words into said memory locations.

6. The programmer claimed in claim 5, wherein:

said manually-controllable counter means also comprises a display controlling counter;

and display controlling means operable by said display counter for indicating displaying the selected address of the memory.

7. The programmer claimed in claim 5, wherein:

said program counter comprises a binary counter for addressing said memory in a binary number basis;

and said manually-controllable counter means also comprises a binary-coded-decimal display counter operable in unison with said binary counter through its counting range in response to the manual control;

and means for preventing said binary counter from stepping out of count synchronism with said BCD counter if the latter is attempted to be recycled at the end of its down counting range;

and indicator means responsive to the state of said display controlling counter for displaying indicating the selected address of said memory in decimal digits.

8. The programmer claimed in claim 5, wherein:

said program counter comprises an up-down binary counter for addressing said memory on a binary number basis and being selectively operable to count up or down in response to respective up or down actuations of the manually controllable means;

and said manually-controllable counter means also comprises an up-down binary-coded-decimal display controlling counter operable to count up or down in response to said respective up or down actuations of said manually-controllable means in unison with said up-down binary counter;

and means for using an inherent characteristic of said up-down BCD counter to cause said up-down binary counter to track the same to stop both counters at zero at its recycle point comprising:

means responsive to applying a down count signal to said up-down BCD counter when it is at zero count in the down direction thereby to cause said BCD counter to issue a carry-out signal;

and means utlizing said carry-out signal to hold said up-down binary counter and up-down BCD counter at zero.

9. The programmer claimed in claim 5, wherein:

said means controlled by said selectively-operable entry control means and said clock comprises means for automatically advancing said program counter to address the next memory location.

10. The programmer for wire number programming of a ladder diagram claimed in claim 1, wherein:

said plural data word set storage locations comprises a series of plural binary bit instruction word storage locations arranged into successive addresses with each address having three storage sublocations known as fields F1, F2 and F3;

said logic circuit means comprises means for generating successive sets of time period signals with four time period signals F0, F1, F2 and F3 in each set; and first multiplexing means for multiplexing the storage fields F1, F2 and F3 of each address during the corresponding time periods F1, F2 and F3 to enable said memory;

said encoding means comprises three sets of selector switches F1, F2 and F3 that are settable to encode said wire number program including said input wire number F1, said control element number F2, and an output wire number F3, or said output program including said input wire number F1 and said controlled element number F3;

one selector switch of set F2 being settable to program on one data line of a data bus the normally-open or normally-closed state of the control element being programmed;

said logic circuit means comprises second multiplexing means for multiplexing data from said F1, F2 and F3 selector switches through said data bus to said memory fields during the corresponding time periods, and counting means comprising a program binary counter for addressing said memory locations, and manually-controllable means for setting said program counter at a desired memory location under the control of said time period signal F0;

and said selectively-operable entry control means comprises manually-controllable means operable to control said data multiplexing means to pass said data from said F1, F2 and F3 selector switches to said memory fields and for simultaneously applying a write signal to said memory to store the data therein in the corresponding F1, F2 and F3 fields.

11. The programmer claimed in claim 10, wherein:

said one selector switch of set F2 is settable to program a 1-bit or a 0-bit to distinguish a normally-closed and a normally-open control element in said wire number program;

display means for displaying said data upon being stored in said memory;

and logic means for preventing said 1-bit from being added to the contact number display and for indicating the 0-bit and 1-bit separately.

12. The programmer claimed in claim 11, wherein:

said selectively-operable entry control means comprises means operable to enter said output program and for automatically applying a special code of all 1's through said data bus for storage in the F2 field of the memory as indicative of an output program;

said logic means comprising means for detecting the special code on said data bus and for passing the same including the 1 on said one data line toward said display means;

and decoder means in said display means responsive to all 1's on said data bus for blanking the display.

13. The programmer claimed in claim 11, wherein:

said display means comprises three display devices and third multiplexing means for multiplexing said display devices under the control of said time period signals F1, F2 and F3 so as to display the correct input wire number, contact number, and output wire number of a wire number program respectively, thereon or to display the input wire number and the output element number on the first and third display devices.

14. The programmer claimed in claim 13, wherein:

said sets of selector switches are manually set on a decimal basis and comprise means to convert these decimal settings to binary-coded-decimal numbers for transmittal on said data bus.

15. The programmer claimed in claim 12, wherein:

said decoder means comprises BCD-to-seven-segment decoders for providing a decimal display of the BCD codes stored in the memory.

16. The programmer claimed in claim 15 wherein:

said first multiplexing means causes stored data to be read from the memory whenever a write signal is not being applied and which stored data is displayed in decimal form under the control of said third multiplexing means.

17. A method of wire number programming of a ladder diagram and storing such program in a nonvolatile memory for use in running a programmable controller comprising the steps:

plugging said memory into the programmer in order to electrically connect said memory to the programming logic therein;

setting the programmer counter to a predetermined memory address;

repeatedly setting predetermined numbers of sets of decoding selector devices to a wire number program followed each time by selective operation of entry control means to store the corresponding wire number program in the memory comprising:

for control elements in the ladder diagram such as input devices and control relay contacts in series circuit with a controlled element such as a control relay or output device, setting three sets of said decoding selector devices to the input wire number to the control element, the control element number, and the output wire number from the control element, respectively, the input wire number of each successive control element being the same as the output wire number of the immediately preceding control element;

then selectively operating said entry control means to store the corresponding wire number program in the memory;

for control elements in the ladder diagram such as input devices and control relay contacts in parallel circuit with one another in the energizing circuit of a controlled element such as a control relay or output device, setting two sets of said decoding selector devices in random sequence to the input wire number to such control element and to the control element number, respectively, and for the last one of said parallel control elements to be programmed, setting a third set of said decoding selector devices to the output wire number from said parallel control elements;

and selectively operating said entry control means after said decoding selector devices for each said parallel control element has been set to store the wire number programs for said parallel control elements in said random sequence in said memory whereupon said programmer introduces a special code in place of said output wire number in said memory each time said entry control means is operated for each control element other than the last programmed control element of a plurality of said parallel control elements.

18. The method of wire number programming claimed in claim 17, wherein said method also comprises:

then unplugging said non-volatile memory from said programmer for use in a programmable controller.

* * * * *